United States Patent
Cho

(10) Patent No.: US 9,600,170 B2
(45) Date of Patent: Mar. 21, 2017

(54) VIDEO DISPLAY DEVICE AND CONTROL METHOD FOR CONTROLLING MULTISPEED VIDEO SEARCH

(71) Applicant: LG ELECTRONICS INC., Seoul (KR)

(72) Inventor: Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 522 days.

(21) Appl. No.: 13/779,236

(22) Filed: Feb. 27, 2013

(65) Prior Publication Data

US 2014/0195911 A1    Jul. 10, 2014

(30) Foreign Application Priority Data

Jan. 10, 2013 (KR) .................. 10-2013-0002775

(51) Int. Cl.
*G06F 3/048* (2013.01)
*G06F 3/00* (2006.01)
*G06F 3/0488* (2013.01)
*G06F 3/0484* (2013.01)
*G06F 3/0485* (2013.01)

(52) U.S. Cl.
CPC .......... *G06F 3/0488* (2013.01); *G06F 3/0484* (2013.01); *G06F 3/0485* (2013.01)

(58) Field of Classification Search
CPC .................................. G06F 3/048; G06F 3/00
USPC .......................................................... 715/719
See application file for complete search history.

(56) References Cited

U.S. PATENT DOCUMENTS

| | | | |
|---|---|---|---|
| 5,864,330 A * | 1/1999 | Haynes | 715/856 |
| 2005/0010955 A1* | 1/2005 | Elia | G06F 3/0482 |
| | | | 725/88 |
| 2006/0161870 A1* | 7/2006 | Hotelling et al. | 715/863 |
| 2009/0172543 A1* | 7/2009 | Cronin et al. | 715/721 |
| 2010/0001993 A1* | 1/2010 | Finn et al. | 345/419 |
| 2010/0082585 A1 | 4/2010 | Barsook et al. | |
| 2010/0083115 A1 | 4/2010 | Park | |
| 2010/0281371 A1* | 11/2010 | Warner et al. | 715/720 |
| 2011/0035700 A1* | 2/2011 | Meaney et al. | 715/784 |
| 2011/0320945 A1 | 12/2011 | Wong et al. | |
| 2012/0079430 A1* | 3/2012 | Kwahk | G06F 3/0488 |
| | | | 715/834 |

(Continued)

FOREIGN PATENT DOCUMENTS

EP         1 838 093 A1    9/2007
WO    WO 2008/115845 A1   9/2008

*Primary Examiner* — Jennifer To
*Assistant Examiner* — Hugo Molina
(74) *Attorney, Agent, or Firm* — Birch, Stewart, Kolasch & Birch, LLP

(57) ABSTRACT

A video display device provides multispeed video search, and a control method thereof. The device includes a video display unit to display a video, and a sensor unit to detect user input and transmit an input signal based on the detected user input to a processor that provides a video search interface. The video search interface includes an image display interface, a thumbnail search interface displaying thumbnails of a video, and a thumbnail control interface controlling the image display interface and/or the thumbnail search interface. The thumbnail control interface includes a circular controller, and controls display of an image on the image display interface based on rotation of the circular controller.

26 Claims, 25 Drawing Sheets

(56) References Cited

U.S. PATENT DOCUMENTS

2012/0086722 A1* 4/2012 Miyazawa et al. ............ 345/619
2013/0141362 A1* 6/2013 Asanuma ................ G06F 3/041
                                                         345/173
2013/0185753 A1* 7/2013 Kliot .............................. 725/39

* cited by examiner

VIDEO DISPLAY DEVICE AND CONTROL METHOD FOR CONTROLLING MULTISPEED VIDEO SEARCH

This application claims the benefit of Korean Patent Application No. 10-2013-0002775, filed on, Jan. 10, 2013, which is hereby incorporated by reference as if fully set forth herein.

BACKGROUND OF THE INVENTION

Field of the Invention

The present disclosure relates to a video display device and a control method thereof, and more particularly to a video display device that provides multispeed video search, and a control method thereof.

Discussion of the Related Art

A variety of applications and programs for video playback and video search have been developed. Video search includes multispeed search on a plurality of thumbnails representing a video. Also, video search includes multispeed search of a plurality of constituent frames of a video. This allows a user to easily search a desired section during video viewing.

Meanwhile, with the recent advance of digital device technology, user input using a mouse or pointer, and various other user input methods, such as touch input, gesture input, etc. have been introduced. Thus, applications for video playback and video search require provision of a user interface capable of simply searching a video even via various kinds of user input. In particular, there is a need for video search applications that can perform video search via simple user input and provide intuitive display of search results.

SUMMARY OF THE INVENTION

Accordingly, the present disclosure is directed to a video display device and a control method thereof that substantially obviate one or more problems due to limitations and disadvantages of the related art.

An object of the present disclosure is to provide a video display device that enables video search via simple and intuitive user input, and a control method thereof.

Another object of the present disclosure is to provide a user with results of video search via user input in an intuitive manner.

Another object of the present disclosure is to provide a video display device capable of providing fast or slow video search based on user input and a control method thereof.

More specifically, a further object of the present disclosure is to provide an interface capable of providing approximate or precise video search based on intuitive user input.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video display device includes a display unit configured to display a video, a sensor unit configured to detect user input and transmit an input signal based on the detected user input to a processor, and the processor configured to provide a video search interface, wherein the video search interface includes an image display interface, a thumbnail search interface displaying a plurality of thumbnails with respect to the video that is being displayed on the image display interface, and a thumbnail control interface controlling at least one of the image display interface and the thumbnail search interface, wherein the thumbnail control interface includes a circular controller, and wherein the thumbnail control interface controls display of an image on the image display interface based on rotation of the circular controller, and wherein display of at least one of the image displayed on the image display interface and the plurality of thumbnails displayed on the thumbnail search interface is controlled based on a positional relationship between the thumbnail search interface and the thumbnail control interface.

In accordance with another aspect of the present disclosure, a control method using a video display device, includes providing a video search interface, wherein the video search interface includes an image display interface, a thumbnail search interface displaying a plurality of thumbnails with respect to the video that is being displayed on the image display interface, and a thumbnail control interface controlling at least one of the image display interface and the thumbnail search interface, and wherein the thumbnail control interface includes a circular controller, detecting a first input signal, rotating the circular controller in response to the first input signal, and controlling an image displayed on the image display interface based on the rotation of the circular controller.

In accordance with a further aspect of the present disclosure, a control method using a video display device, includes providing a video search interface, wherein the video search interface includes an image display interface, a thumbnail search interface displaying a plurality of thumbnails with respect to the video that is being displayed on the image display interface, and a thumbnail control interface controlling at least one of the image display interface and the thumbnail search interface, detecting a first input signal, controlling a positional relationship between the thumbnail search interface and the thumbnail control interface in response to the first input signal, and controlling at least one of an image displayed on the image display interface and the plurality of thumbnails displayed on the thumbnail search interface based on the positional relationship between the thumbnail search interface and the thumbnail control interface.

These and other aspect of the present disclosure will be described in the following detailed description of the invention.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in the following description are selected, as much as possible, from general terms that are widely used at present while taking into consideration the functions obtained in accordance with the present disclosure, these terms may be replaced by other terms based on intensions of those skilled in the art, customs, emergence of new technologies, or the like. Also, in a particular case, terms that are arbitrarily selected by the applicant of the present disclosure may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

Moreover, although exemplary embodiments will be described hereinafter in detail with reference to the accompanying drawings and content written in the accompanying drawings, the disclosure is not limited or restricted by the embodiments.

Figure 1:
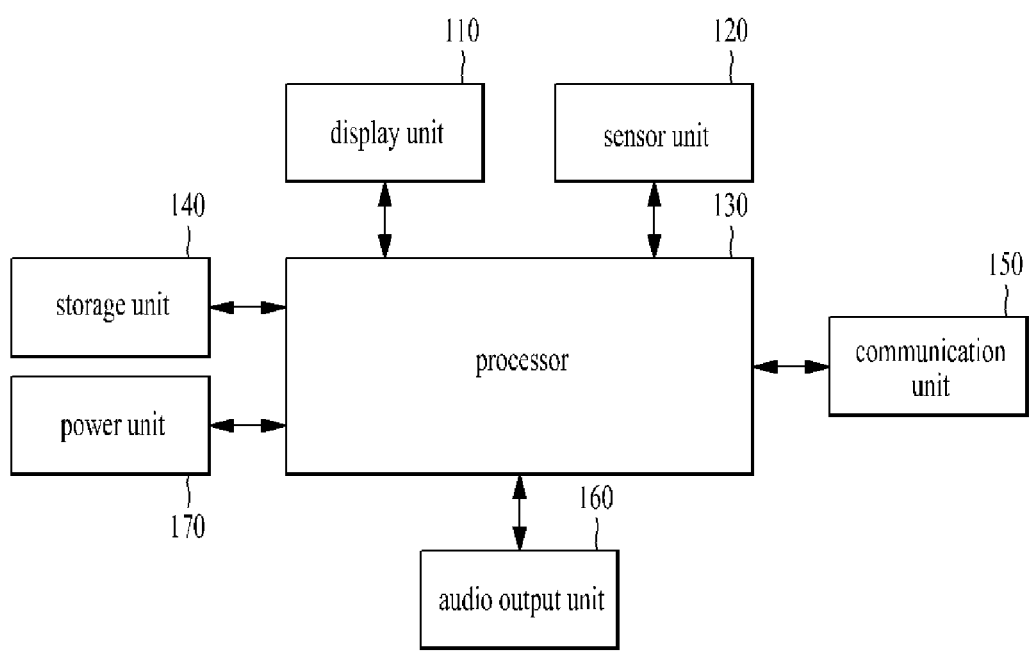
FIG. 1 is a block diagram illustrating a video display device.

FIG. 1 is a block diagram illustrating a video display device. Referring to FIG. 1, the video display device 100 may include a display unit 110, a sensor unit 120, a processor 130, a storage unit 140, a communication unit 150, an audio output unit 160, and a power unit 170.

The video display device 100 may include various digital devices that enables image display and data communication, such as a PC, Personal Digital Assistant (PDA), laptop computer, tablet PC, television, smart-phone, etc. Herein, the video display device 100 may include various digital devices including a touchscreen.

The display unit 110 outputs an image on a display screen. The display unit 110 may output an image based on content provided from the processor 130 or a control command of the processor 130. According to an embodiment, the display unit 110 may display a video search interface that is executed by the video display device 100. More specifically, the display unit 110 may display an image of a specific frame corresponding to a thumbnail search interface, a thumbnail control interface, and a thumbnail that is searched by the video search interface.

The sensor unit 120 may detect user input using at least one sensor mounted to the video display device 100 and transmit an input signal based on the detected result to the processor 130. In this case, the sensor unit 120 may include a plurality of sensing means. In an embodiment, the plurality of sensing means may include a gravity sensor, geomagnetic sensor, motion sensor, gyro sensor, accelerometer, infrared sensor, inclination sensor, brightness sensor, height sensor, olfactory sensor, temperature sensor, depth sensor, pressure sensor, bending sensor, audio sensor, video sensor, Global Positioning System (GPS) sensor, and touch sensor, for example. The sensor unit 120 is a generic term for the above described various sensing means. Also, the sensor unit 120 may sense a variety of user inputs and user environments and may transmit the sensed result to the processor 130 to allow the processor 130 to implement an operation based on the sensed result. The aforementioned sensors may be provided as individual elements included in the video display device 100, or may be combined to constitute at least one element.

According to the present disclosure, the sensor unit 120 may detect various user inputs. Herein, the user inputs may include touch input, gesture input, voice input, etc. The user inputs may include input from the user hand, input from an object, etc. For example, the touch input may include a long-touch, touch-and-drag, multi-touch, etc. Herein, the sensor unit 120 may detect user input with respect to a thumbnail search interface or a thumbnail control interface. For example, the user input with respect to the thumbnail search interface may correspond to user input to move an indicator displayed in the thumbnail search interface. The user input with respect to the thumbnail control interface may correspond to user input to rotate or move the thumbnail control interface. This will hereinafter be described with reference to FIGS. 6A to 8D.

The processor 130 may process content received via data communication, content stored in the storage unit 140, or the like. Also, the processor 130 may execute various applications and process data in the device. Herein, the processor 130 may provide a video search interface. The video search interface may include an image display interface, a thumbnail search interface that displays a plurality of thumbnails with respect to a video being displayed in the image display interface, and a thumbnail control interface to control at least one of the image display interface and the thumbnail search interface. The processor 130 may control the respective units of the image display device 100 and data communication between the units. In one embodiment, the processor 130 may control the video search interface based on user input received from the sensor unit 120. Operations of the processor 130 will hereinafter be described with reference to FIGS. 11 and 12.

The storage unit 140 may store various digital data, such as videos, audios, photographs, applications, etc. The storage unit 140 may include various digital data storage spaces, such as a flash memory, Random Access Memory (RAM), Solid Stage Drive (SSD), etc.

The communication unit 150 may perform communication using an external device and various protocols, and perform data transmission/reception. The communication unit 150 may be connected to a network in a wired or wireless manner and transmit/receive digital data such as content, etc. Herein, the video display device 100 may transmit/receive a video to or from an external device or server using the communication unit 150. Herein, the communication unit 150 may be selectively provided in the video display device 100.

The audio output unit 160 may include audio output means, such as a speaker, earphone, etc. The audio output unit 160 may output content processed by the processor 130 or voice based on a control command of the processor 130. According to an embodiment, the audio output unit 160 may output voice of a video that is being played back. Herein, the audio output unit 160 may be selectively provided on the video display device 100.

The power unit 170 may be a power source connected to a battery within the device or an external power source, and may supply power to the video display device 100.

The video display device 100 illustrated in FIG. 1 is a block diagram according to an embodiment in which separate blocks logically classify elements of the device. Thus, the aforementioned elements of the device may be mounted as a single chip or a plurality of chips based on device design.

Figure 2:
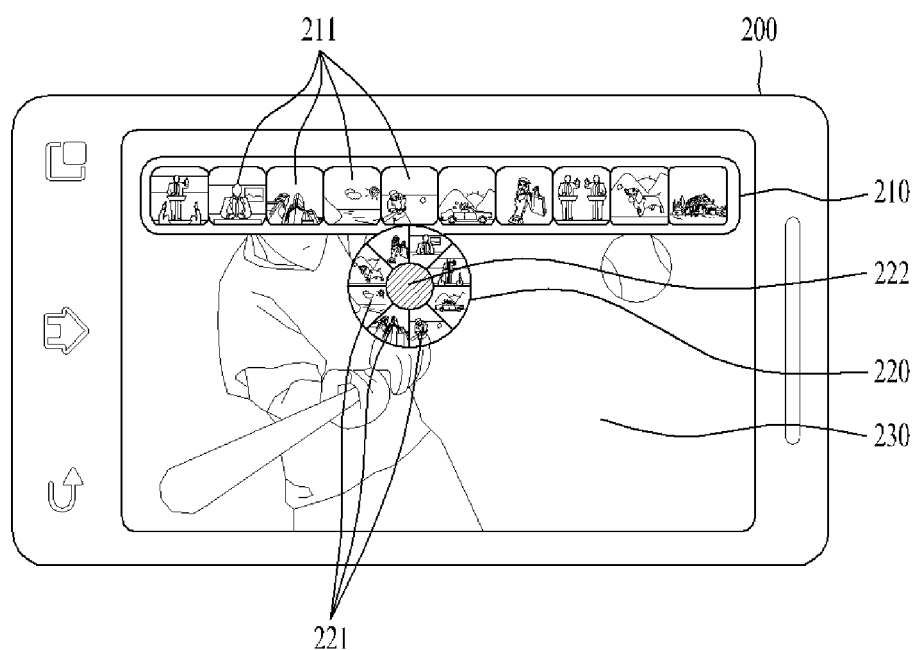
FIG. 2 is a diagram illustrating a video search interface.

FIG. 2 is a view illustrating a video search interface. The video search interface may include a thumbnail search interface 210, a thumbnail control interface 220, and an image display interface 230. The video search interface may be provided by a video display device 200.

The thumbnail search interface 210 may display a plurality of thumbnails 211 with respect to a video that is being displayed on the image display interface 230. The thumbnail search interface 210 may represent a timeline consisting of a plurality of thumbnails, in order to represent the position of a frame that is being played back among all frames during playback of a video. The thumbnail search interface 210 may be located at one of upper and lower sides and left and right sides or at the center of the video search interface. The thumbnails 211 displayed on the thumbnail search interface 210 may be varied in position or size as the video is played back.

Herein, the plurality of thumbnails 211 may correspond to reduced frame images that represent only some of a plurality of constituent frames of a video. Each of the plurality of thumbnails 211 may correspond to a thumbnail image that displays a representative frame of each group that is obtained by grouping all constituent frames of a video at a preset interval. Here, the representative frame of each group may include a first frame, a last frame, and a middle frame. The plurality of thumbnails 211 displayed on the thumbnail search interface 210 may correspond to some constituent frames of a video displayed in the time sequence. For example, left ones of the plurality of thumbnails 211 may correspond to anterior thumbnails and right ones may correspond to posterior thumbnails in the time sequence.

Alternatively, the plurality of thumbnails 211 displayed on the thumbnail search interface 210 may correspond to thumbnails that represent the entire video. The plurality of thumbnails 211 displayed on the thumbnail search interface 210 may correspond to thumbnails that represent a part of a video. For example, when a video consists of 1800 frames, the plurality of thumbnail images 211 displayed on the thumbnail search interface 210 may correspond to representative thumbnails of all 1800 frames. In another embodiment, the plurality of thumbnails 211 displayed on the thumbnail search interface 210 may correspond to representative thumbnails of 600 frames of the 1800 frames. In this case, some of the thumbnails displayed on the thumbnail search interface 210 may disappear and new thumbnails may be displayed based on video search results.

According to an embodiment, the video display device 200 may adjust a preset size of the plurality of thumbnails 211 based on a video search speed. For example, the video display device 200 may reduce the size of the thumbnails 211 if the video search speed is increased. Also, the video display device 200 may increase the size of the thumbnails 211 if the video search speed is reduced. This will be described hereinafter with reference to FIGS. 6A and 7D.

Next, the thumbnail control interface 220 may control at least one of the thumbnail search interface 210 and the image display interface 230. The thumbnail control interface 220 is located at an upper end or a lower end of the thumbnail search interface 210 and is freely movable by user input. More specifically, the video display device 200 may detect user input to the thumbnail control interface 220 and may rotate or move the thumbnail control interface 220 based on the detected user input. Accordingly, the video display device 200 may control at least one of the thumbnail search interface 210 and the image display interface 230 based on rotation or movement of the thumbnail control interface 220.

Meanwhile, the thumbnail control interface 220 may be displayed in the form of a circular controller. For example, the circular controller may include a circular button 222 at the center thereof. A plurality of thumbnails 221 may be displayed around the circular button 222. The plurality of thumbnails 221 may correspond to a plurality of thumbnails with respect to a plurality of frames that correspond to a time interval between one thumbnail corresponding to the position of the thumbnail control interface 220 and the next thumbnail among the plurality of thumbnails 211 displayed on the thumbnail search interface 210. As such, the plurality of thumbnails 221 may enable detailed search with respect to each of the plurality of thumbnails 211 displayed on the thumbnail search interface 210.

In one embodiment, the video display device 200 may control at least one of display of the plurality of thumbnails 211 on the thumbnail search interface 210 and an image displayed on the image display interface 230 according to a positional relationship between the thumbnail search interface 210 and the thumbnail control interface 220. The positional relationship between the thumbnail search interface 210 and the thumbnail control interface 220 may include a distance and corresponding position between the thumbnail search interface 210 and the thumbnail control interface 220. For example, when the distance between the thumbnail search interface 210 and the thumbnail control interface 220 is reduced, a search speed of the plurality of thumbnails 211 displayed on the thumbnail search interface 210 may be reduced. On the other hand, for example, when the distance between the thumbnail search interface 210 and the thumbnail control interface 220 is increased, a search speed of the plurality of thumbnails 211 displayed on the thumbnail search interface 210 may be increased. Also, for example, based on corresponding position between the thumbnail search interface 210 and the thumbnail control interface 220, the video display device 200 may control the plurality of thumbnails 211 displayed on the thumbnail search interface 210 or an image displayed on the image display interface 230. This will hereinafter be described with reference to FIGS. 5A and 5B.

Next, the image display interface 230 may display a video that is being played back by the video display device 200. The image display interface 230 may successively display images of a plurality of constituent frames of a video. In one embodiment, an image displayed on the image display interface 230 may be determined based on a positional relationship between the thumbnail search interface 210 and the thumbnail control interface 220. For example, the image displayed on the image display interface 230 may be successively changed based on a positional relationship between the thumbnail search interface 210 and the thumbnail control interface 220. Referring to FIG. 2, the video display device 200 may display, on the image display interface 230, a frame image of the thumbnail of the plurality of thumbnails 211 displayed on the thumbnail search interface 210 corresponding to the position of the thumbnail control interface 220. Alternatively, the video display device 200 may display, on the image display interface 210, a frame image corresponding to user input to the thumbnail control interface 220.

Figure 3:
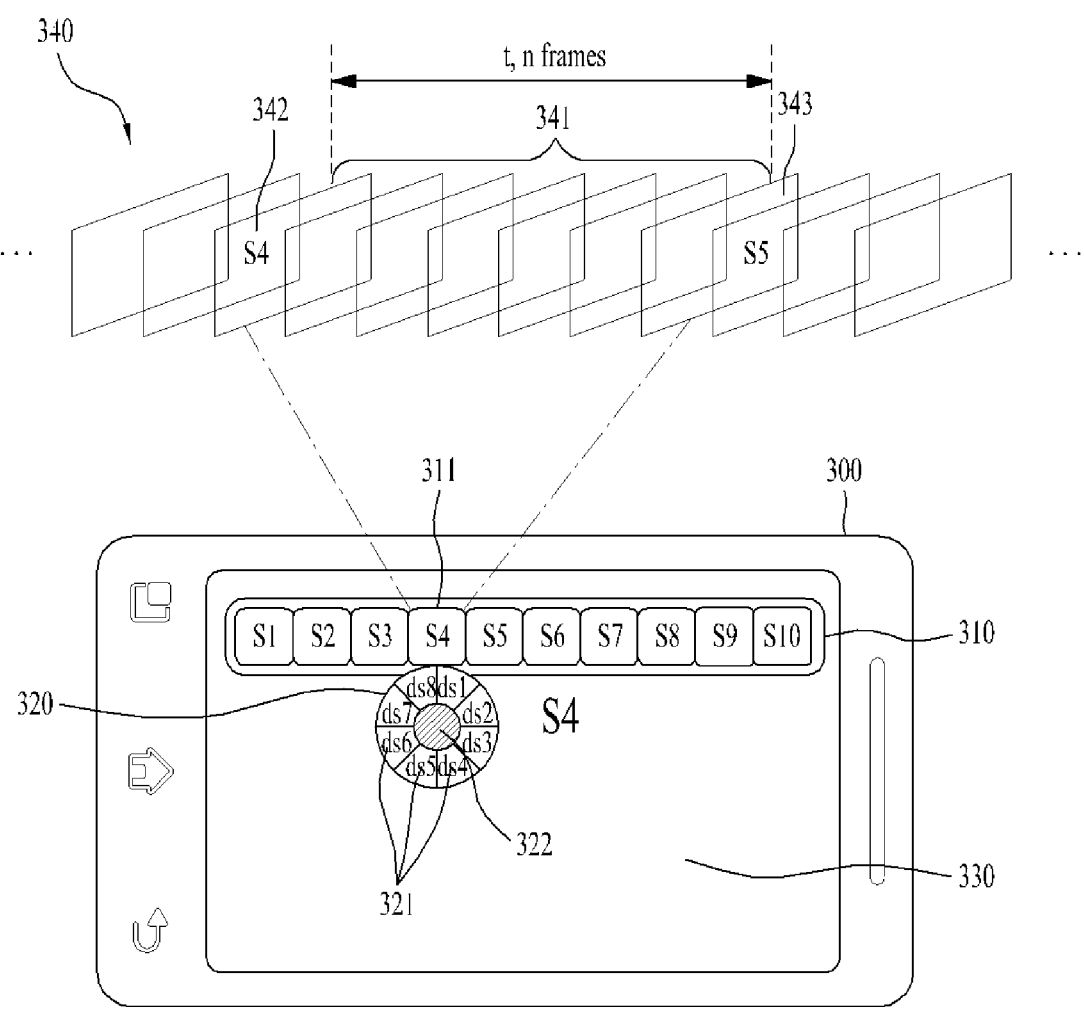
FIG. 3 is a diagram illustrating a relationship between a plurality of constituent frames of a video and thumbnails of a thumbnail search interface.

FIG. 3 is a diagram illustrating a relationship between a plurality of constituent frames of a video and thumbnails of a thumbnail search interface.

FIG. 3 illustrates a relationship between a plurality of video constituent frames, thumbnails of a thumbnail search interface 310, a thumbnail control interface 320 and an image display interface 330. First, a video that is played back on a video display device 300 may consist of a plurality of frames 340. For example, frames of a video may correspond to 30 frames per second, or 60 frames per second.

As described above in FIG. 2, the video display device 300 may include a video search interface. The video search interface may provide the thumbnail search interface 310. In this case, the thumbnail search interface 310 may include a plurality of thumbnails. In one embodiment, the thumbnails displayed on the thumbnail search interface 310 may be displayed one by one per a preset number of frames. For example, each thumbnail displayed on the thumbnail search interface 310 may display n frames of video constituent frames displayed for a t time. The displayed thumbnail may correspond to an image of a first frame of the n frames. For example, referring to FIG. 3, a frame image displayed in an S4 thumbnail 311 corresponds to a first frame within a $341^{st}$ section of the frames 340. Alternatively, the displayed thumbnail may correspond to a last frame image among the n frames. For example, frames corresponding to the S4 thumbnail 311 may correspond to n frames corresponding to the $341^{st}$ section of the video constituent frames 340. As such, when the thumbnail control interface 320 is positioned to correspond to the S4 thumbnail 311 of the thumbnail search interface 310, the video display device 300 may search the n frames corresponding to the $341^{st}$ section. In this case, the video display device 300 may successively display frames of the $341^{st}$ frame i.e. starting from a $342^{nd}$ frame to a $343^{rd}$ frame on the image display interface 330. Additionally, the video display device 300 may change the number of frames n and the time t corresponding to each of the plurality of thumbnails 311 displayed on the thumbnail search interface 310. This may be determined based on the position and movement of the thumbnail control interface 320 in response to user input.

The video search interface may provide the thumbnail control interface 320. As described above in FIG. 2, the thumbnail control interface 320 may include a circular button 322 and a plurality of thumbnails 321. Referring to FIG. 3, the thumbnail control interface 320 may include ds1 to ds8 thumbnails that are detailed thumbnails 321 corresponding to the section of the S4 thumbnail 311. For example, when the S4 thumbnail 311 corresponds to 80 frames, each of the ds1 to ds8 thumbnails may correspond to 10 frames. The detailed thumbnails 321 may be provided to enable more detailed search of frames provided at and around each of the plurality of thumbnails 311 during video search. For example, the detailed thumbnails 321, i.e. the ds1 to ds8 thumbnails may correspond to some of the frames of the $341^{st}$ section.

Referring to FIG. 3, when the thumbnail control interface 320 is displayed at the center of the S4 thumbnail 311, the ds1 to ds8 thumbnails may be provided to provide more detailed search of the frames corresponding to the S4 thumbnail 311, i.e. the frames of the 340 section. Alternatively, for example, when the thumbnail control interface 320 is displayed at the middle between an S3 thumbnail and the S4 thumbnail, the ds1 to ds8 thumbnails may be provided to enable more detailed search from a middle frame of frames corresponding to the S3 thumbnail to a middle frame of the frames corresponding to the S4 thumbnail.

In one embodiment, when the video display device 300 detects user input to the plurality of thumbnails 321, the video display device 300 may display, on the image display interface 330, a frame image of a thumbnail of a plurality of video constituent frames corresponding to the user input. The user input may include user input to select at least one of the plurality of thumbnails 321, or user input to rotate the plurality of thumbnails 321. For example, when the video display device 300 detects user input to the ds2 thumbnail, the video display device 300 may display a frame image of the ds2 thumbnail on the image display interface 330. In another embodiment, when the video display device 300 detects user input to the circular button 322, the video display device 300 may move the position of the thumbnail control interface 320. Also, when the video display device 300 detects user input to the circular button 321, the video display device 300 may move the plurality of thumbnails displayed on the thumbnail search interface 310. This will hereinafter be described with reference to FIGS. 8A to 8D.

Also, the video search interface may provide the image display interface 330. The image display interface 330 may display one thumbnail image of the detailed thumbnails 321 on the thumbnail control interface 320 in response to user input. For example, referring to FIG. 3, the image display interface 330 may display a frame image of the S4 thumbnail 311 of the plurality of thumbnails displayed on the thumbnail search interface 310 corresponding to the position of the thumbnail control interface 320. Also, the image display interface 330 may sequentially display the plurality of frames corresponding respectively to the plurality of thumbnails of the thumbnail search interface 310 in response to user input.

In the case of video search as described above, it is possible to search a part that the user wishes to display using various thumbnails. Even in this case, more intuitive and efficient video search using a circular controller may be accomplished as compared to the case of performing search by simply providing user input to thumbnails. This will hereinafter be described in more detail with reference to FIGS. 4A to 11.

Figure 4A:
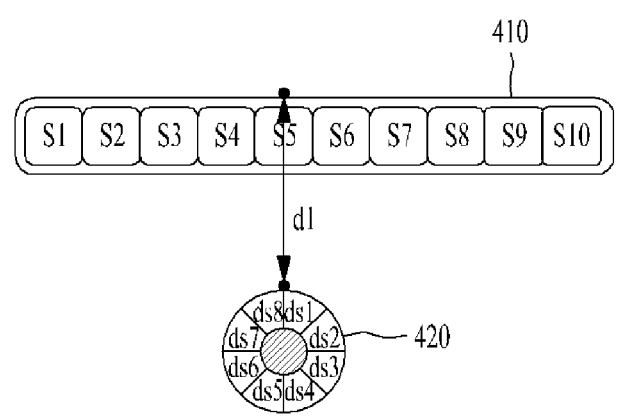
FIGS. 4A and 4B are diagrams illustrating a positional relationship between a thumbnail search interface and a thumbnail control interface.
Figure 4B:
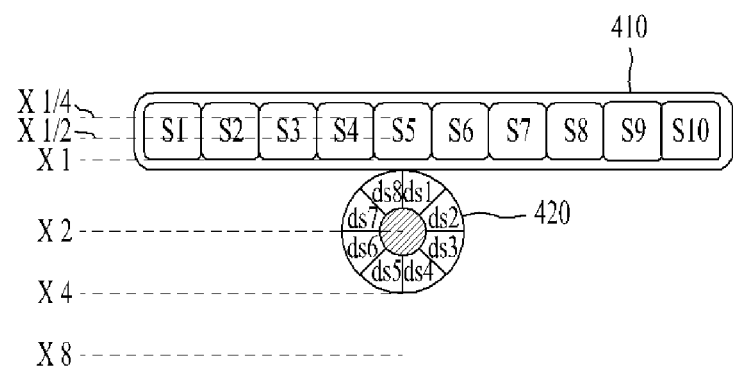

FIGS. 4A and 4B are views illustrating a positional relationship between a thumbnail search interface and a thumbnail control interface. The positional relationship between a thumbnail search interface 410 and a thumbnail control interface 420 may include a distance and corresponding position between the thumbnail search interface 410 and the thumbnail control interface 420. A video display device 400 may control an image that will be displayed on an image display interface 430 based on the distance between the thumbnail search interface 410 and the thumbnail control interface 420.

First, the video display device 400 may control a search speed of an image displayed on the image display interface 430 based on the distance between the thumbnail search interface 410 and the thumbnail control interface 420. In one embodiment, referring to FIG. 4A, the distance between the thumbnail search interface 410 and the thumbnail control interface 420 may include a distance d1 between an uppermost point of the thumbnail search interface 410 and an uppermost point of the thumbnail control interface 420. In another embodiment, the distance between the thumbnail search interface 410 and the thumbnail control interface 420 may include a distance between a middle height point of the thumbnail search interface 410 and the center point of the thumbnail control interface 420. In another embodiment, the distance between the thumbnail search interface 410 and the thumbnail control interface 420 may include the shortest distance between the thumbnail search interface 410 and the thumbnail control interface 420. Referring to FIG. 4B, the video display device 400 may control multispeed search speed based on the distance between the thumbnail search interface 410 and the thumbnail control interface 420. In one embodiment, the video display device 400 may set a state in which the thumbnail search interface 410 and the thumbnail control interface 420 are in contact with each other to 1× multispeed search. For example, the 1× multispeed search may represent general video playback. Further, referring to FIG. 4B, the video display device 400 may set a state in which the uppermost point of the thumbnail control interface 420 is located at the middle height point of the thumbnail search interface 410 to ½× multispeed search. Furthermore, referring to FIG. 4B, the video display device 400 may set a state in which the thumbnail search interface 410 and the thumbnail control interface 420 are spaced apart from each other by a preset distance to 2× multispeed search. Additionally, as illustrated in FIG. 4B, the video display device 400 may control ¼×, 4× and 8× multispeed search based on the distance between the thumbnail search interface 410 and the thumbnail control interface 420. However, it will be appreciated that the video display device 400 may set a search speed in a method contrary to the aforementioned examples, or may set a search speed based on various criteria.

Additionally, the video display device 400 may control a time interval between thumbnails displayed on the thumbnail search interface 410 based on the distance between the thumbnail search interface 410 and the thumbnail control interface 420. For example, the video display device 400 may set a time interval between respective ones of the plurality of thumbnails displayed on the thumbnail search interface 410 to 10 seconds in the case of 1× multispeed video search. In this case, the video display device 400 may set a time interval between respective ones of the plurality of thumbnails displayed on the thumbnail search interface 410 to 20 seconds in the case of ½× multispeed video search. Also, the video display device 400 may set a time interval between respective ones of the plurality of thumbnails displayed on the thumbnail search interface 410 to 5 seconds in the case of 2× multispeed video search.

Also, the video display device 400 may also control the number of frames corresponding to each of the plurality of thumbnails displayed on the thumbnail search interface 410 based on the distance between the thumbnail search interface 410 and the thumbnail control interface 420. For example, the video display device 400 may set the number of frames corresponding to each of the plurality of thumbnails displayed on the thumbnail search interface 410 to 100 in the case of 1× multispeed video search. In this case, the video display device 400 may set the number of frames corresponding to each of the plurality of thumbnails displayed on the thumbnail search interface 410 to 50 in the case of ½× multispeed video search. Also, the video display device 400 may set the number of frames corresponding to each of the plurality of thumbnails displayed on the thumbnail search interface 410 to 200 in the case of 2× multispeed video search.

Also, the video display device 400 may also control the size of at least one of the plurality of thumbnails displayed on the thumbnail search interface 410 based on the distance between the thumbnail search interface 410 and the thumbnail control interface 420. For example, the video display device 400 may control the size of the thumbnail of the plurality of thumbnails displayed on the thumbnail search interface corresponding to the position of the thumbnail control interface 420 based on the distance between the thumbnail search interface 410 and the thumbnail control interface 420. This will hereinafter be described with reference to FIGS. 6A and 7D.

Alternatively, the video display device 400 may display, on the image display interface 430, an image of a thumbnail of the thumbnails displayed on the thumbnail search interface 410 corresponding to the position of the thumbnail control interface 420 based on corresponding positions between the thumbnail search interface 410 and the thumbnail control interface 420. For example, the corresponding positions between the thumbnail search interface 410 and the thumbnail control interface 420 may include at least one position of the plurality of thumbnails displayed on the thumbnail search interface 410 corresponding to the position of the thumbnail control interface 420. This will hereinafter be again described with reference to FIGS. 6A and 7D.

Figure 5A:
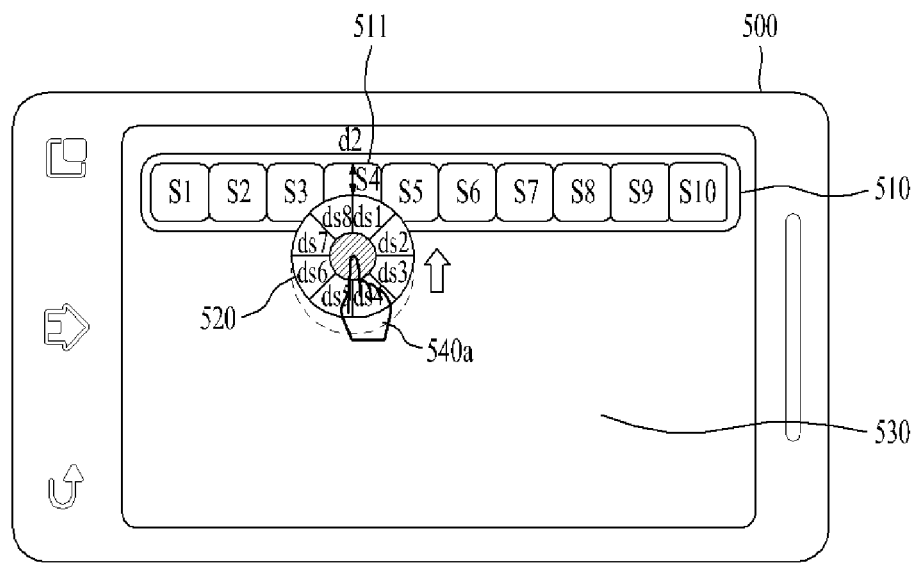
FIGS. 5A and 5B are diagrams illustrating an embodiment of a positional relationship between a thumbnail search interface and a thumbnail control interface in a video search interface.
Figure 5B:
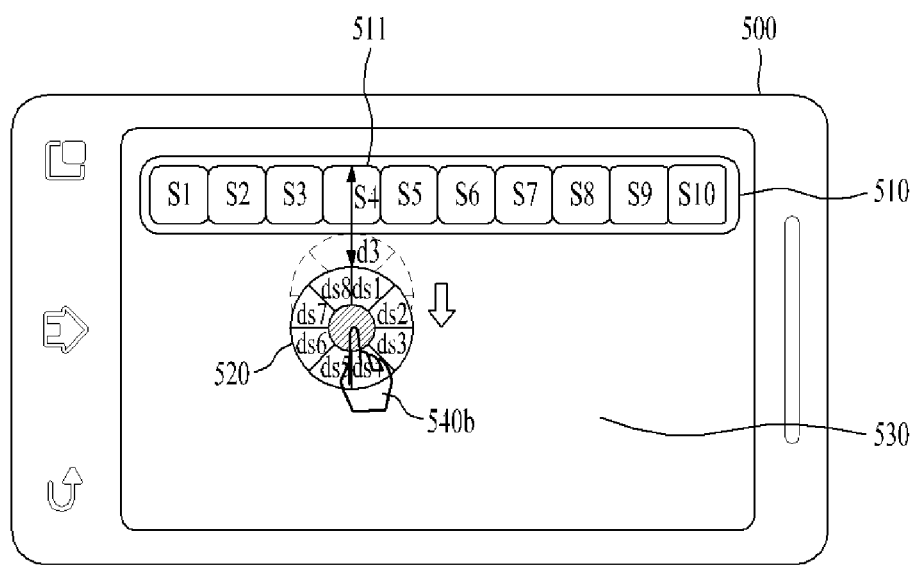

FIGS. 5A and 5B are views illustrating an embodiment of a positional relationship between a thumbnail search interface and a thumbnail control interface in a video search interface. More specifically, FIGS. 5A and 5B illustrate movement of a thumbnail control interface in response to detected user input.

In one embodiment, referring to FIG. 5A, a video display device 500 may detect user input 540a, and control reduction in a distance between a thumbnail search interface 510 and the thumbnail control interface 520 based on the detected user input 540a. In this case, the smaller the distance between the thumbnail search interface 510 and the thumbnail control interface 520, the slower the search speed of thumbnails displayed on the thumbnail search interface 520 under control of the video display device 500. For example, referring to FIG. 5A, when the thumbnail control interface 520 is moved closer to the thumbnail search interface 510 so as to overlay a half of the height of the thumbnail search interface 510 (d2), the video display device 500 may control a search speed of the thumbnails displayed on the thumbnail search interface 510 to be reduced to ½×.

Additionally, the video display device 500 may control a search speed of a frame image displayed on the image display interface 530 to be reduced as the distance between the thumbnail search interface 510 and the thumbnail control interface 520 is reduced. For example, if the thumbnail control interface 520 is moved closer to the thumbnail search interface 510 so as to overlay a half of the height of the thumbnail search interface 510 (d2), the video display device 500 may control a search speed of the frame image displayed on the image display interface 530 to be reduced to ½×. For example, referring to FIG. 5A, the video display device 500 may control a search speed of frames displayed on the image display interface 530 corresponding to an S5 thumbnail 511 to be reduced to ½×. Alternatively, the video display device 500 may control a search speed of at least one of images displayed on the image display interface 530 and thumbnails displayed on the thumbnail search interface 520 to be reduced as the distance between the thumbnail search interface 510 and the thumbnail control interface 520 is reduced.

In another embodiment, referring to FIG. 5B, the video display device 500 may detect user input 540b, and control increase in the distance between the thumbnail search interface 510 and the thumbnail control interface 520 based on the detected user input 540b. In this case, the greater the distance between the thumbnail search interface 510 and the thumbnail control interface 520, the faster the search speed of thumbnails displayed on the thumbnail search interface 520 under control of the video display device 500. For example, if the thumbnail control interface 520 is spaced apart from the thumbnail search interface 510 by a preset distance d3, the video display device 500 may control a search speed of the thumbnails displayed on the thumbnail search interface 510 to be increased to 2×. Referring to FIG. 5B, the video display device 500 may control a search speed of the S5 thumbnail 511 of the plurality of thumbnails displayed on the thumbnail search interface 510 corresponding to the position of the thumbnail control interface 520 to be increased to 2×.

Also, the video display device 500 may control a search speed of the frame image displayed on the image display interface 530 to be increased as the distance between the thumbnail search interface 510 and the thumbnail control interface 520 is increased. For example, if the thumbnail control interface 520 is spaced apart from the thumbnail search interface 510 by the preset distance d3, the video display device 500 may control a search speed of the frame image displayed on the image display interface 530 to be increased to 2×. For example, referring to FIG. 5B, the video display device 500 may control a search speed of frames displayed on the image display interface 530 corresponding to the S5 thumbnail 511 to be increased to 2×. Alternatively, the video display device 500 may control a search speed for at least one of images displayed on the image display interface 530 and thumbnails displayed on the thumbnail search interface 520 to be reduced as the distance between the thumbnail search interface 510 and the thumbnail control interface 520 is increased.

FIGS. 6A to 6E are views illustrating an embodiment of a video search interface.

More specifically, FIGS. 6A to 6E illustrate variation of a thumbnail search interface 610 in the case in which a distance between the thumbnail search interface 610 and a thumbnail control interface 620 in a video search interface is reduced. A video display device 600 may increase or reduce a video search speed as the distance between the thumbnail search interface 610 and the thumbnail control interface 620 is reduced. The embodiment of FIGS. 6A to 6E exemplify the case in which a video search speed is reduced as the distance between the thumbnail search interface 610 and the thumbnail control interface 620 is reduced.

Figure 6A:
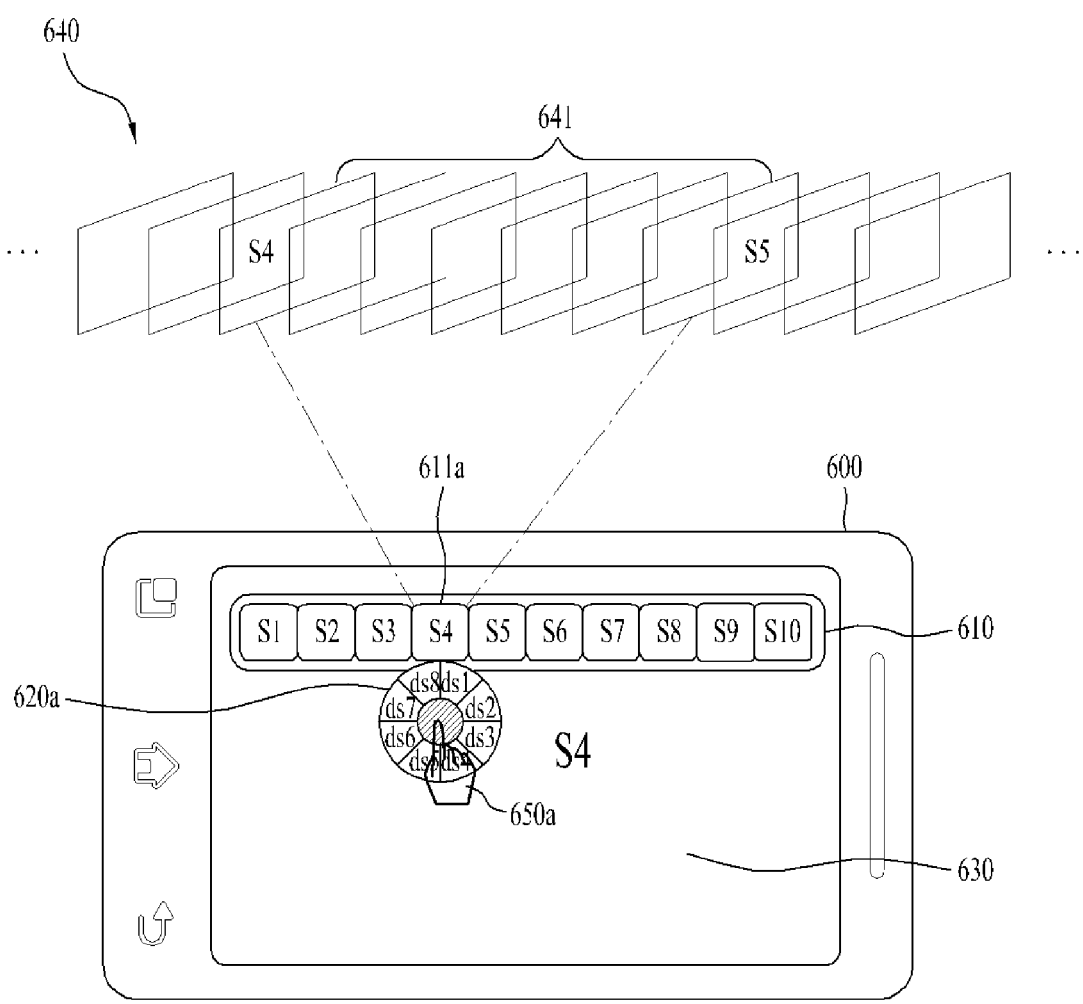
FIGS. 6A to 6E are diagrams illustrating an embodiment of a video search interface.

First, referring to FIG. 6A, the video display device 600 may detect user input 650a. In one embodiment, the video display device 600 may detect the user input 650a to a circular button that is located at the center of a thumbnail control interface 620a. Here, the user input 650a, as described above in FIG. 1, may include finger touch input, object touch input, or hovering input. In this case, the video display device 600 may begin search for thumbnails or frame images of a video. Referring to FIG. 6A, the case in which the thumbnail search interface 610 and the thumbnail control interface 620a come into contact with each other may correspond to a basic search mode, i.e. 1× multispeed search. Thus, when receiving the user input 650a, the video display device 600 may play back a frame image of a thumbnail 611a of a plurality of thumbnails displayed on the thumbnail search interface 610, which comes into contact with the thumbnail control interface 620a, on the image display interface 600 at normal speed. Referring again to FIG. 6A, the video display device 600 may play back the frame image on the image display interface 630 at normal speed of 1×. For example, the video display device 600 may play pack n frames 641 corresponding to an S4 thumbnail 611a on the image display interface 630 for a t time.

Next, referring to FIGS. 6B to 6E, the video display device 600 may detect user input 650b, 650c, 650d or 650e. More specifically, the video display device 600 may detect the user input 650b, 650c, 650d or 650e to a circular button of the thumbnail control interface 620. Here, the user input 650b, 650c, 650d or 650e may correspond to upwardly moving user input as compared to the user input 650a illustrated in FIG. 6A. For example, the user input 650b, 650c, 650d or 650e may include touch-and-drag, long-touch, multi-touch, etc. The video display device 600 may move the position of the thumbnail control interface 620 in response to the detected user input 650b, 650c, 650d or 650e to allow the distance between the thumbnail search interface 610 and the thumbnail control interface 620 to be reduced. Next, as the distance between the thumbnail search interface 610 and the thumbnail control interface 620 is reduced, the video display device 600 may control a search speed of an image displayed on the image display interface 630 and a search speed of a plurality of thumbnails displayed on the thumbnail search interface 610 to be reduced. Here, reducing a search speed enables more detailed search of a plurality of video constituent frames and may correspond to low-multispeed search. For example, reducing a search speed may include reduction in the number of frames corresponding to thumbnails within a preset time, or increase in the playback time of the same number of frames.

Figure 6B:
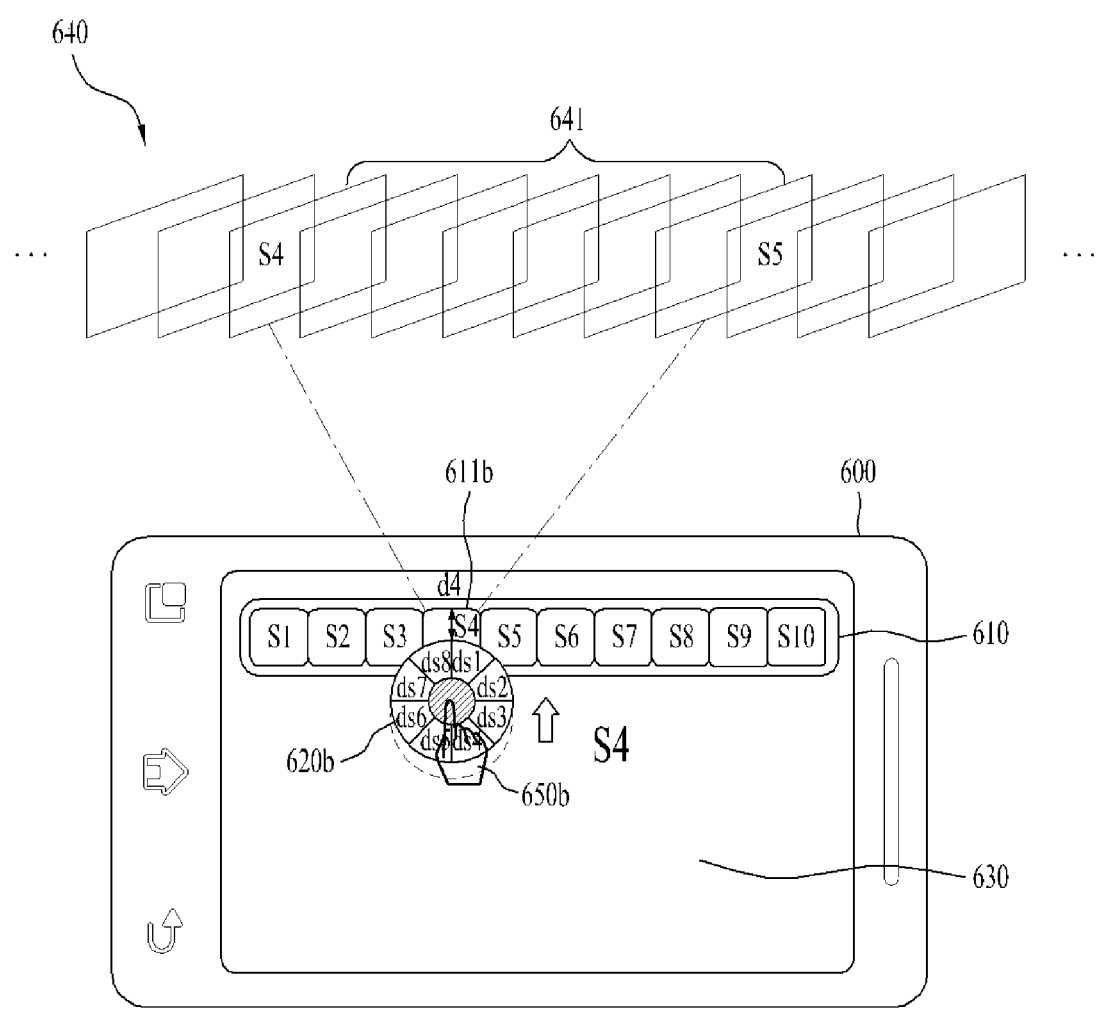

In one embodiment, referring to FIG. 6B, the video display device 600 may display a thumbnail control interface 620b to overlay the thumbnail search interface 610 in response to the detected user input 650b. In this case, the thumbnail search interface 610 may partially go out of sight by the thumbnail control interface 620b. For example, referring to FIG. 6B, when the thumbnail control interface 620b overlays 50% of the height of the thumbnail search interface 610, a part of the S4 thumbnail 611b of the thumbnail search interface 610 may go out of sight. Also, when a distance between an uppermost point of the thumbnail search interface 610 and an uppermost point of the thumbnail control interface 620b is d4, the video display device 600 may control a search speed of thumbnails displayed on the thumbnail search interface 610 to ½×.

Figure 6C:
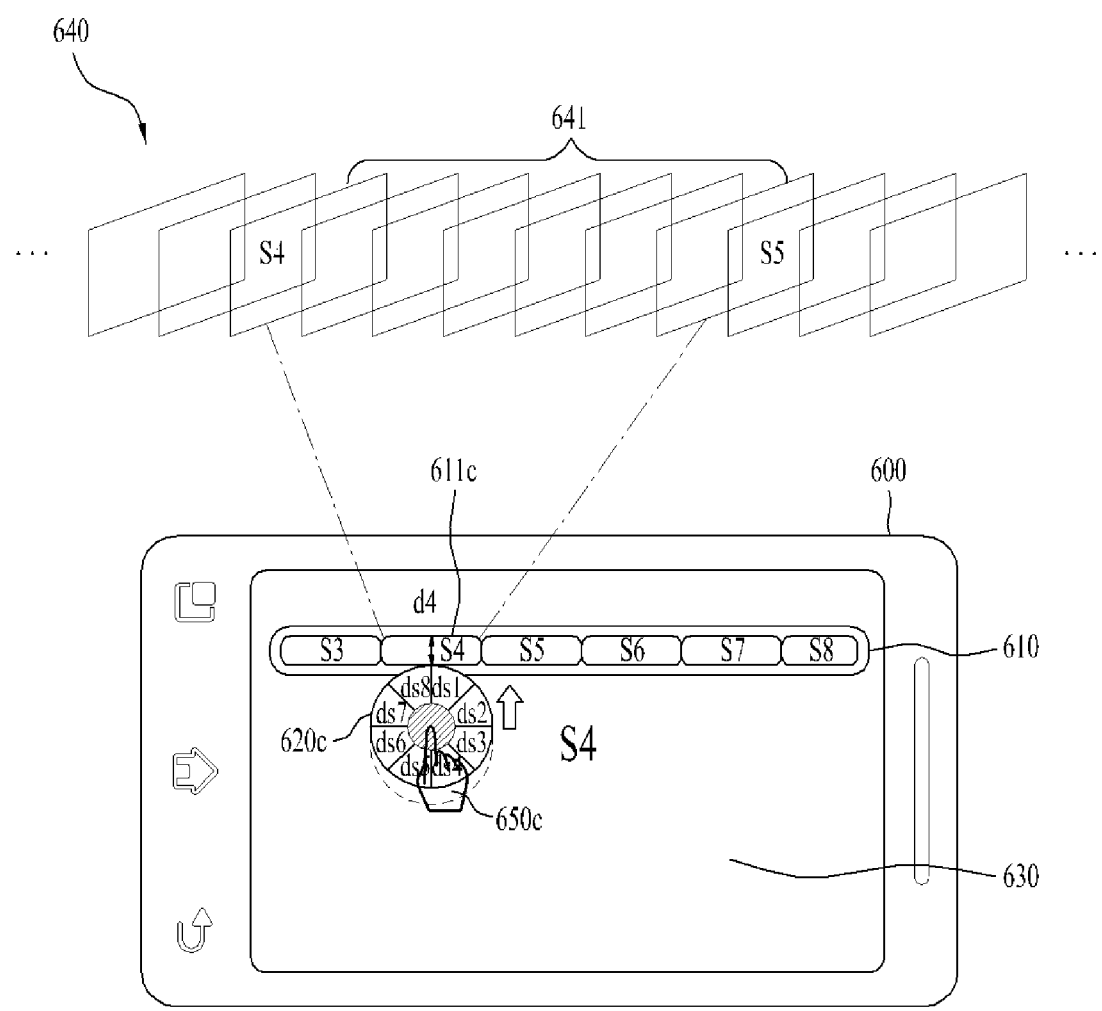

In another embodiment, referring to FIG. 6C, the video display device 600 may control a plurality of thumbnails displayed on the thumbnail search interface 610 in response to the detected user input 650c such that the thumbnails are displayed as being horizontally expanded and vertically contracted. In this case, a vertical contraction rate of the plurality of thumbnails displayed on the thumbnail search interface 610 may be determined based on a distance between an uppermost point of the thumbnail search interface 610 and an uppermost point of a thumbnail control interface 620c. For example, the distance d4 between the uppermost point of the thumbnail search interface 610 and the uppermost point of the thumbnail control interface 620c is d4 may correspond to the case in which the vertical contraction rate of the plurality of thumbnails displayed on the thumbnail search interface 610 is 50%. In this case, the number of thumbnails displayed on the thumbnail search interface 610 may be determined based on a vertical contraction rate and a horizontal expansion rate. For example, referring to FIG. 6C, as described above, the thumbnail search interface 610 displays the thumbnails as being vertically contracted by 50%. In this case, as the horizontal length is expanded two fold, the number of the displayed thumbnails may be reduced from 10 thumbnails to 5 thumbnails. As such, if the vertical length of the thumbnails displayed on the thumbnail search interface is contracted by 25%, the horizontal length of the thumbnails may be expanded four fold.

Figure 6D:
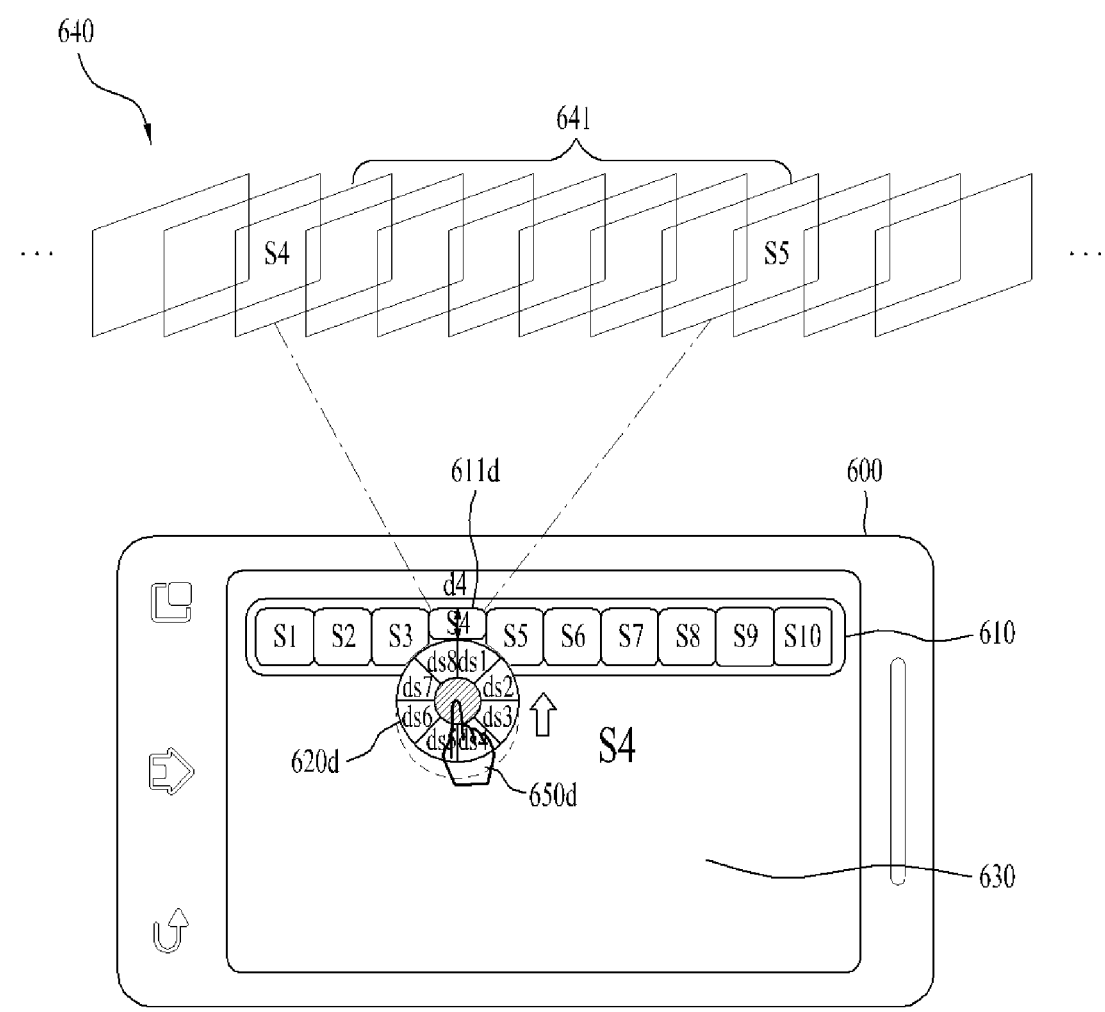

In another embodiment, referring to FIG. 6D, the video display device 600 may contract the size of the thumbnail of the plurality of thumbnails displayed on the thumbnail search interface 610 corresponding to the position of a thumbnail control interface 620d in response to the detected user input 650d. In this case, a size contraction rate of the thumbnail of the plurality of thumbnails displayed on the thumbnail search interface 610 corresponding to the position of the thumbnail control interface 620d may be determined based on a distance between an uppermost point of the thumbnail search interface 610 and an uppermost point of the thumbnail control interface 620d. For example, when the distance between the uppermost point of the thumbnail search interface 610 and the uppermost point of the thumbnail control interface 620d is d4, a vertical length of the thumbnail of the plurality of thumbnails displayed on the thumbnail search interface 610 corresponding to the position of the thumbnail control interface 620d may be contracted by 50%.

Figure 6E:
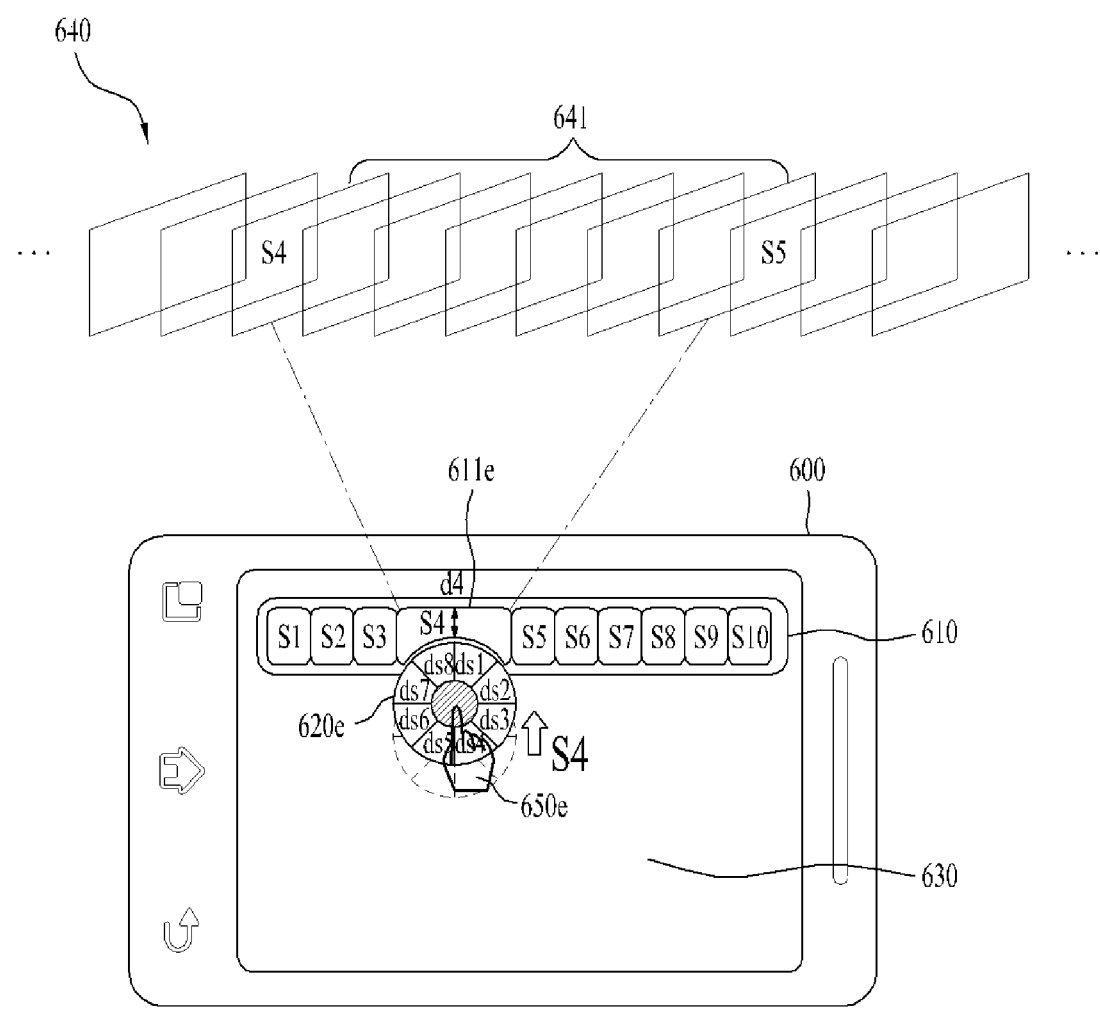

In another embodiment, referring to FIG. 6E, the video display device 600 may deform the shape of the thumbnail of the plurality of thumbnails displayed on the thumbnail search interface 610 corresponding to the position of a thumbnail control interface 620d in response to the detected user input 650d. In one embodiment, the deformed shape of the thumbnail may correspond to a shape upwardly pushed by a thumbnail control interface 620e, as can be appreciated from the S4 thumbnail 611e as illustrated in FIG. 6E. In this case, the width of the deformed S4 thumbnail may be increased in proportion to an overlay area of the thumbnail search interface 610 by the thumbnail control interface 620e. As such, the size of the other thumbnails except for the S4 thumbnail of the plurality of thumbnails displayed on the thumbnail search interface 610 may be varied.

Referring to FIGS. 6B to 6E, when the distance between the uppermost point of the thumbnail search interface 610 and the uppermost point of the thumbnail control interface 620 is d4, the video display device 600 may control a search speed of the thumbnails displayed on the thumbnail search interface 610 to ½×. As such, the position of the thumbnail control interface 620 relative to the thumbnail search interface 610 may be moved by ½×. Alternatively, the plurality of thumbnails displayed on the thumbnail search interface 610 may be moved by ½× relative to the thumbnail control interface 620. Also, for example, when the distance between the uppermost point of the thumbnail search interface 610 and an uppermost point of the thumbnail control interface 620 is d4, the video display device 600 may control a search speed of an image displayed on the image display interface 630 to ½×. As such, n frames 641 corresponding to the S4 thumbnail 611 may be displayed at a search speed of ½×.

With the embodiment of FIGS. 6A to 6E, the user can easily and intuitively recognize that a video search speed is reduced as the distance between the thumbnail search interface 610 and the thumbnail control interface 620 is reduced. Also, the user can more precisely search a frame image displayed on the image display interface 630 and the thumbnails displayed on the thumbnail search interface 610.

FIGS. 7A to 7D are views illustrating an embodiment of a video search interface.

More specifically, FIGS. 7A to 7D illustrate variation of a thumbnail search interface 710 when a distance between the thumbnail search interface 710 and a thumbnail control interface 720 in a video search interface is increased. When the distance between the thumbnail search interface 710 and the thumbnail control interface 720 is reduced, a video display device 700 may increase or reduce a video search speed. The embodiment of FIGS. 7A to 7D exemplify the case in which a video search speed is increased in the case in which the distance between the thumbnail search interface 710 and the thumbnail control interface 720 is increased.

Figure 7A:
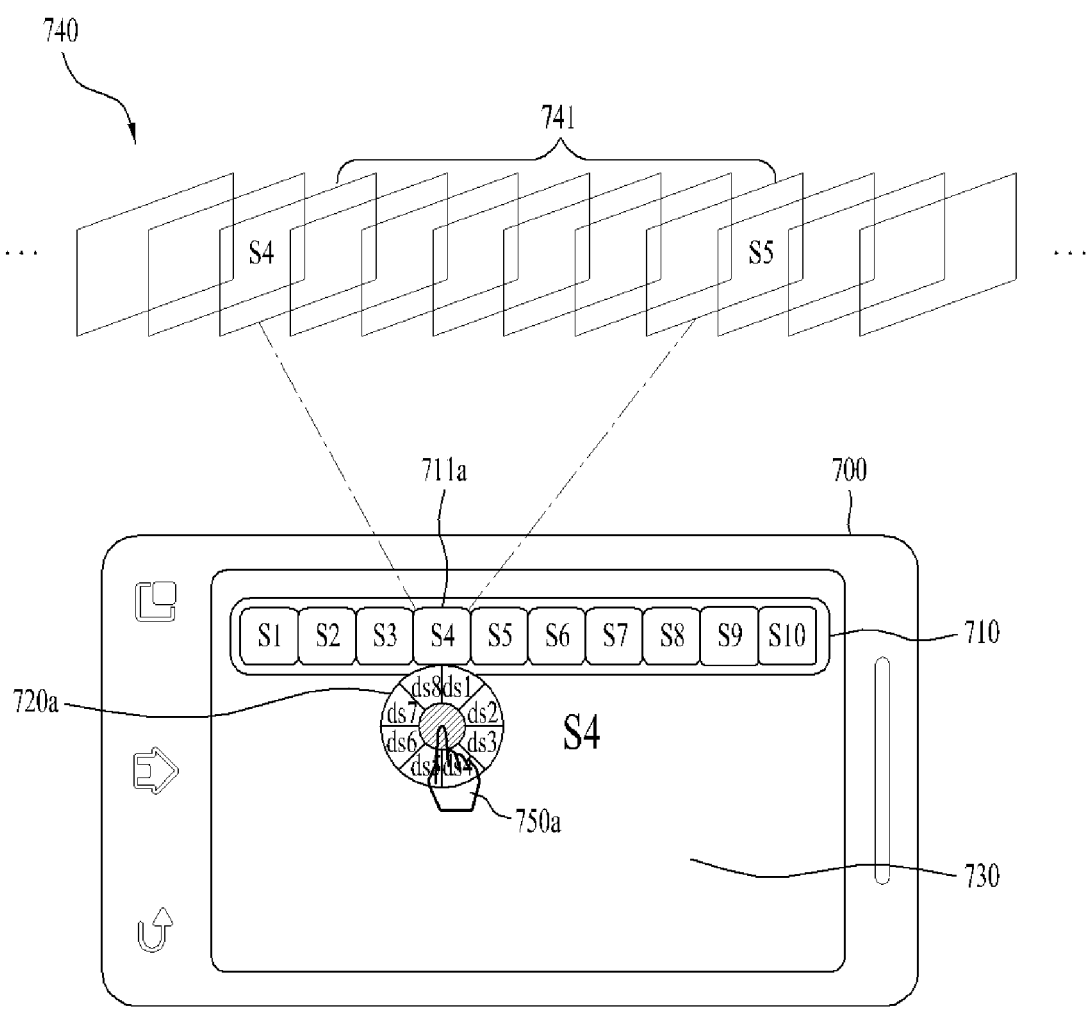
FIGS. 7A to 7D are diagrams illustrating an embodiment of a video search interface.

Referring to FIG. 7A, the video display device 700 may detect user input 750. In one embodiment, the video display device 700 may detect the user input 750 to a circular button of a thumbnail control interface 720a. Here, as described above in FIGS. 6A to 6E, the user input 750 may include finger touch input, object touch input, or hovering input. In this case, the video display device 700 may begin to search for thumbnails or frame images of a video. Referring to FIG. 7A, the case in which the thumbnail search interface 710 and the thumbnail control interface 720a come into contact with each other may correspond to a basic search mode, i.e. 1× multispeed search. As such, when the video display device 700 receives user input 750a, the video display device 700 may play back a frame image of a thumbnail 711a of a plurality of thumbnails displayed on the thumbnail search interface 710, which comes into contact with the thumbnail control interface 720a, on the image display interface 730 at normal speed. Next, the video display device 700 may play back the frame image on the image display interface 730 at normal speed of 1×. For example, the video display device 700 may play back n frames 741 corresponding to the thumbnail 711a on the image display interface 730 for a t time.

Figure 7B:
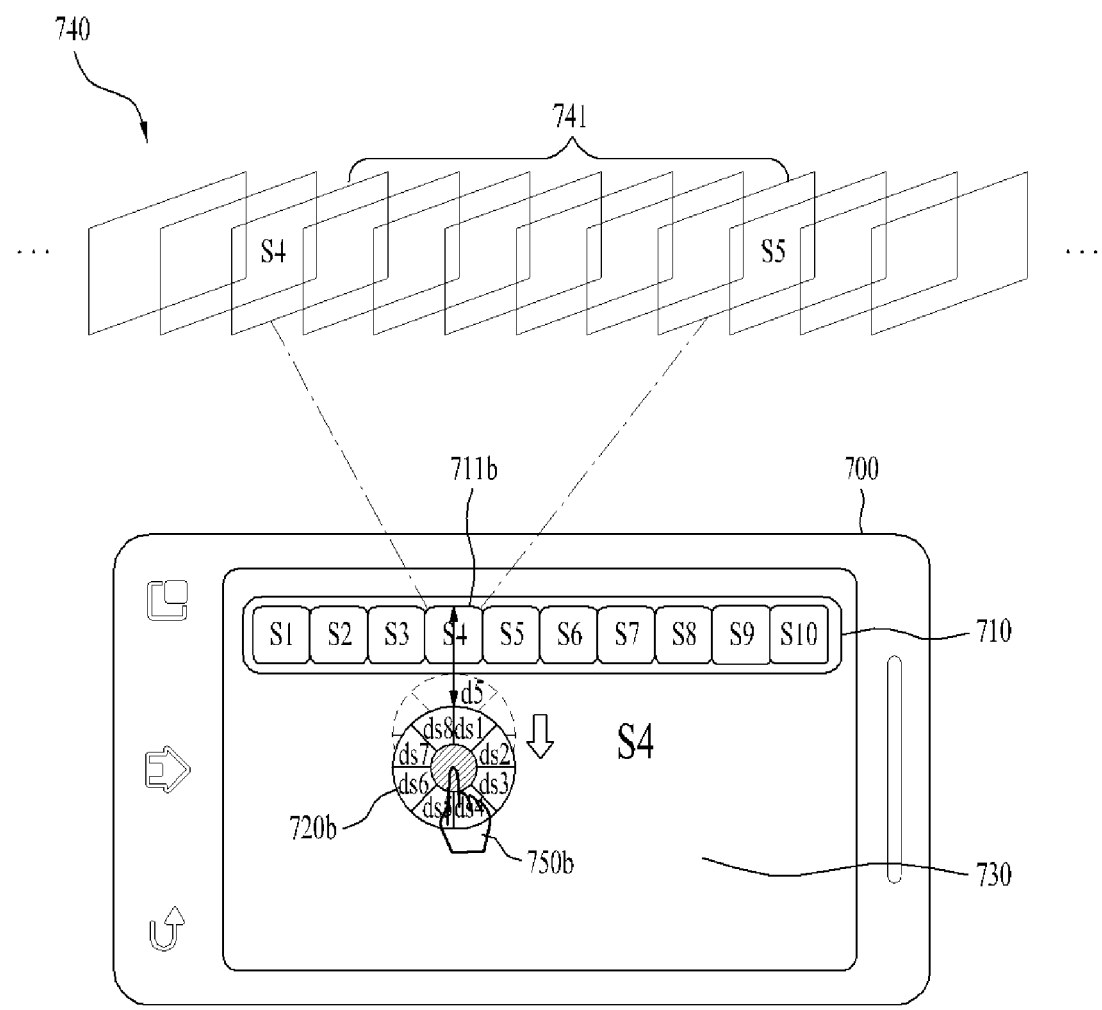
Figure 7C:
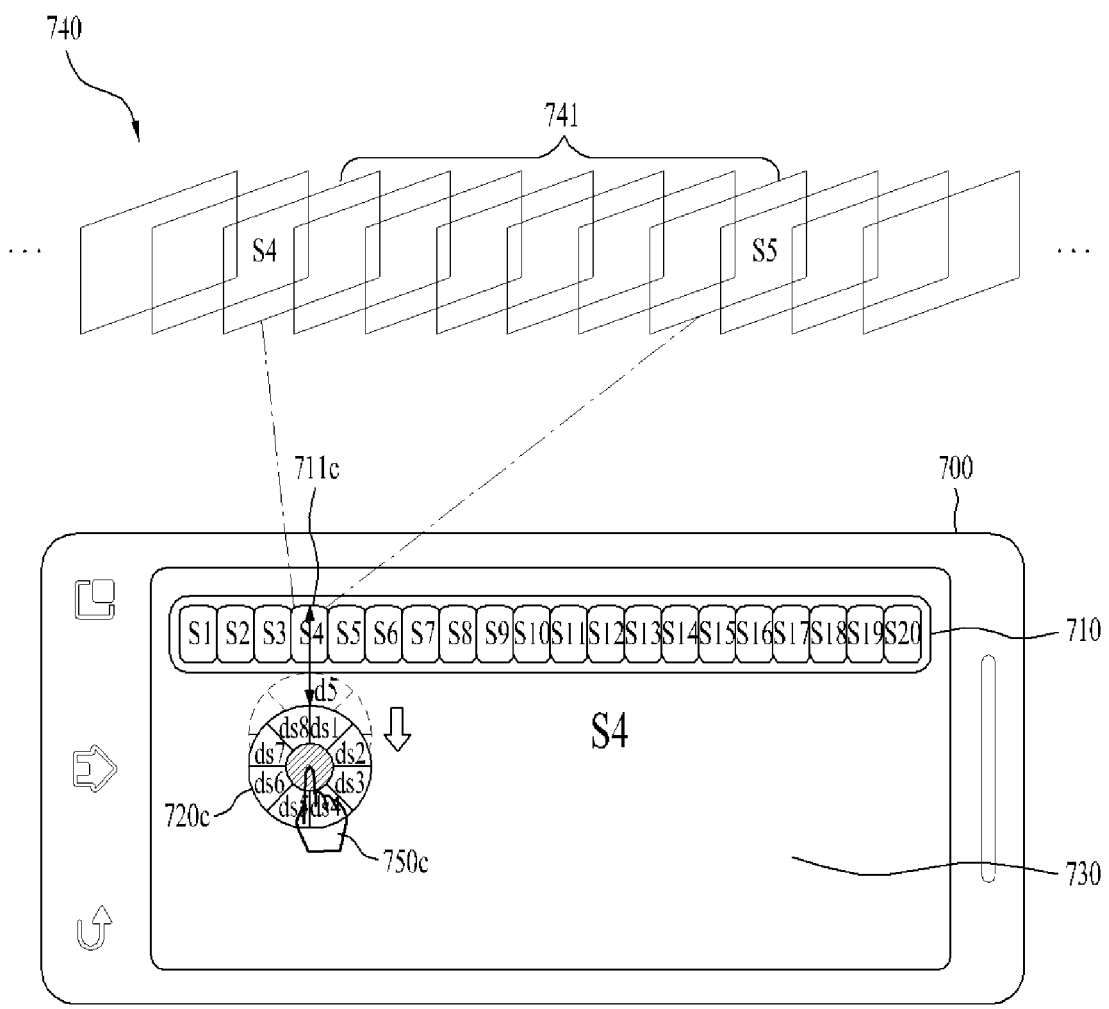
Figure 7D:
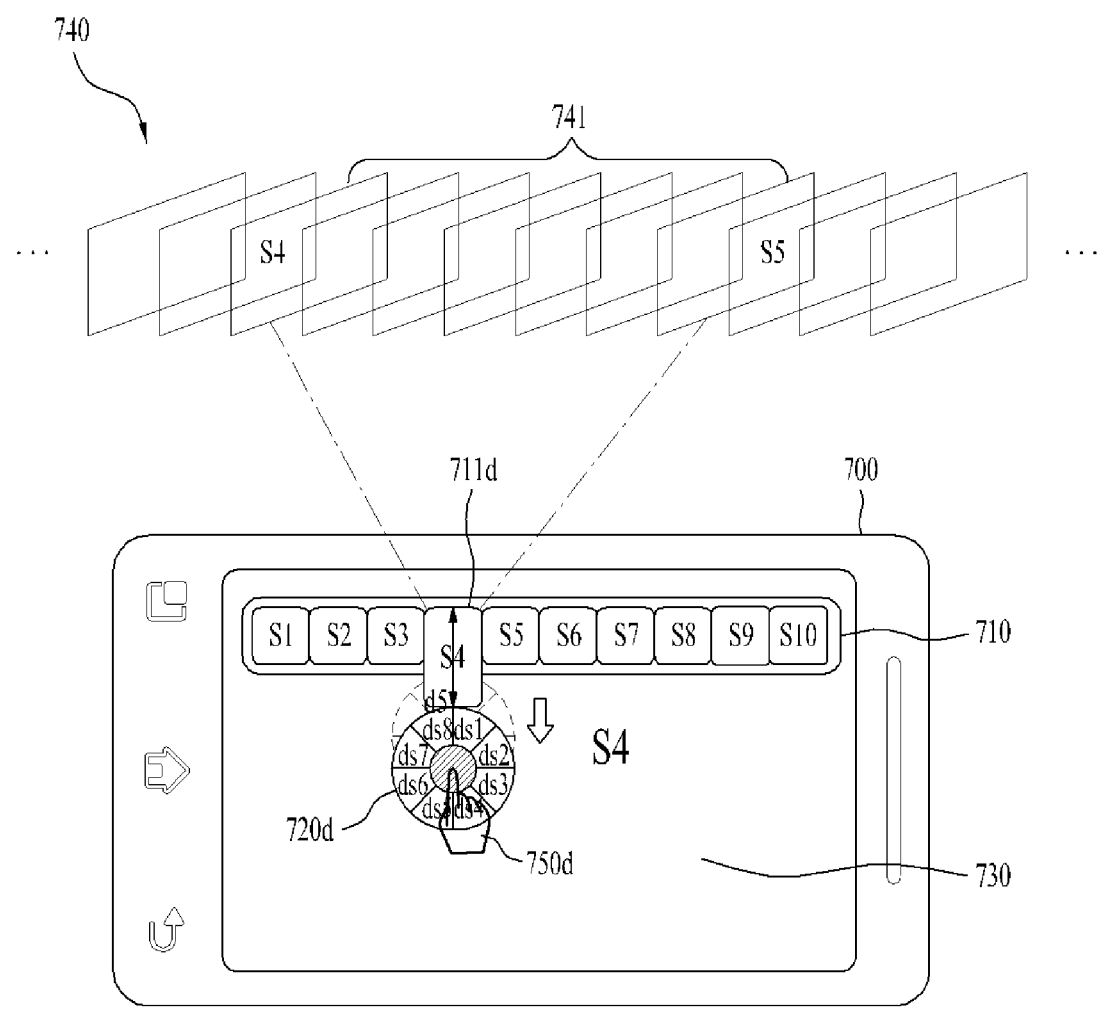

Next, referring to FIGS. 7B to 7D, the video display device 700 may detect user input 750b, 750c or 750d. More specifically, the video display device 700 may detect the user input 750b, 750c or 750d to a circular button of the thumbnail control interface 720. Here, the user input 750b, 750c or 750d may correspond to downwardly moving user input. For example, the user input 750b, 750c or 750d may include touch-and-drag, long-touch and multi-touch. The video display device 700 may increase a distance between the thumbnail search interface 710 and the thumbnail control interface 720 in response to the detected user input 750b, 750c or 750d. Next, the video display device 700 may increase at least one of a search speed of the plurality of thumbnails displayed on the thumbnail search interface 710 and a search speed of an image displayed on the image display interface 730 as the distance between the thumbnail search interface 710 and the thumbnail control interface 720 is increased. Here, increasing a search speed serves to approximately search a plurality of constituent frames of a video and may correspond to high multispeed search. For example, increasing a search speed may include increase in the number of frames corresponding to thumbnails within a preset time, or reduction in the playback time of the same number of frames.

In one embodiment, referring to FIG. 7B, the video display device 700 may allow the thumbnail search interface 710 and the thumbnail control interface 720b to be displayed as being spaced apart from each other in response to the detected user input 750b. In this case, the video control device 700 may control at least one of a search speed of the plurality of thumbnails displayed on the thumbnail search interface 710 and a search speed of a frame image displayed on the image display interface 730 based on a distance between an uppermost point of the thumbnail search interface 710 and an uppermost point of the thumbnail control interface 720b. For example, when the distance between the uppermost point of the thumbnail search interface 710 and the uppermost point of the thumbnail control interface 720b is d5, the video display device 700 may increase a search speed of the thumbnails displayed on the thumbnail search interface 710 to 2×.

In another embodiment, referring to FIG. 7C, the video display device 700 may allow the thumbnail search interface 710 and a thumbnail control interface 720c to be displayed as being spaced apart from each other in response to the detected user input 750. In this case, the video control device 700 may control a horizontal width of the plurality of thumbnails displayed on the thumbnail search interface 710 based on the distance between the uppermost point of the thumbnail search interface 710 and the uppermost point of the thumbnail control interface 720c.

For example, when the distance between the uppermost point of the thumbnail search interface 710 and the uppermost point of the thumbnail control interface 720c is d5, the video display device 700 may reduce the horizontal width of the plurality of thumbnails displayed on the thumbnail search interface 710 to a half of the original value. Thereby, as illustrated in FIG. 7C, the number of thumbnails displayed on the thumbnail search interface 710 may be increased two fold. In one embodiment, when the existing 10 thumbnails represent thumbnails of all constituent frames of a video, the number of frame images corresponding to each thumbnail of the thumbnail search interface 710 may be reduced as the number of thumbnails is increased two fold. In another embodiment, if the existing 10 thumbnails represent only some of all constituent frames of a video, other thumbnails except for the existing thumbnails may be additionally displayed on the thumbnail search interface 710 as the number of thumbnails is increased two fold. Additionally, as described above in FIG. 7B, the video display device 700 may control at least one of a search speed of the plurality of thumbnails displayed on the thumbnail search interface 710 and a search speed of a frame image displayed on the image display interface 730 based on the distance between the uppermost point of the thumbnail search interface 710 and the uppermost point of the thumbnail control interface 720c.

In another embodiment, referring to FIG. 7D, the video display device 700 may display an enlarged size of the thumbnail of the plurality of thumbnails displayed on the thumbnail search interface 710 corresponding to the position of a thumbnail control interface 720d in response to the detected user input 750d. In this case, the video display device 700 may enlarge the size of the thumbnail of the plurality of thumbnails displayed on the thumbnail search interface 710 corresponding to the position of the thumbnail control interface 720d based on the distance between the uppermost point of the thumbnail search interface 710 and the uppermost point of the thumbnail control interface 720d. For example, referring to FIG. 7D, when the distance between the uppermost point of the thumbnail search interface 710 and the uppermost point of the thumbnail control interface 720d is d5, the video display device 700 may enlarge the height of the thumbnail of the plurality of thumbnails displayed on the thumbnail search interface 710 corresponding to the position of the thumbnail control interface 720d based on the distance between the uppermost point of the thumbnail search interface 710 and the uppermost point of the thumbnail control interface 720. In this case, as described above in FIG. 7C, the video display device 700 may control at least one of a search speed of the plurality of thumbnails displayed on the thumbnail search interface 710 and a search speed of the frame image displayed on the image display interface 730 based on the distance between the uppermost point of the thumbnail search interface 710 and the uppermost point of the thumbnail control interface 720.

Referring to FIGS. 7B to 7D, when the distance between the uppermost point of the thumbnail search interface 710 and the uppermost point of the thumbnail control interface 720 is d5, the video display device 700 may control 2× multispeed search of the thumbnails displayed on the thumbnail search interface 710. As such, the position of the thumbnail control interface 720 relative to the thumbnail search interface 710 may be moved by 2×. Also, the plurality of thumbnails displayed on the thumbnail search interface 710 may be moved by 2× on the basis of the thumbnail control interface 720. Also, for example, when the distance between the uppermost point of the thumbnail search interface 710 and the uppermost point of the thumbnail control interface 720 is d5, the video display device 700 may control 2× multispeed search of the frame image displayed on the image display interface 730. As such, the n frames 741 corresponding to an S4 thumbnail 711 may be displayed on the image display interface 730 by a 2× search speed.

With the embodiment of FIGS. 7A to 7D, the user can easily and intuitively recognize increase in the video search speed as the distance between the thumbnail search interface 710 and the thumbnail control interface 720 is reduced. Also, the user can more rapidly search the frame image displayed on the image display interface 730 and the thumbnails displayed on the thumbnail search interface 710.

FIGS. 8A to 8D are views illustrating an embodiment of a video search interface. More specifically, FIGS. 8A to 8D illustrate movement or rotation of a thumbnail control interface.

Figure 8A:
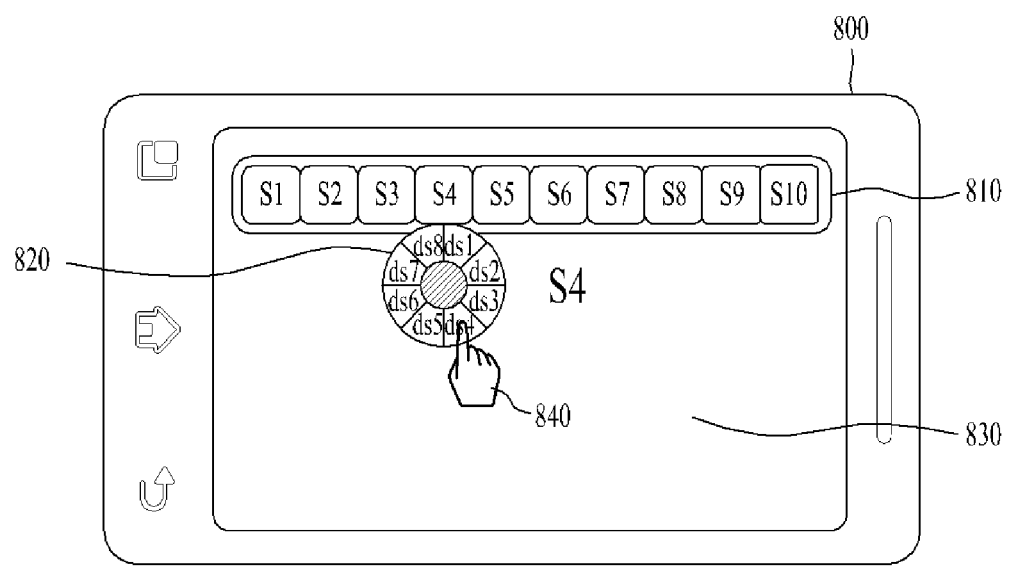
FIGS. 8A to 8D are diagrams illustrating an embodiment of a video search interface.

Referring to FIG. 8A, a video display device 800 may detect user input 840 to a thumbnail control interface 820. Here, the user input 840 may correspond to user input to thumbnails 821 displayed around a circular button of the thumbnail control interface 820. For example, the user input 840 may include touch input or hovering input. Referring to FIG. 8A, the user input 840 may correspond to user input to a ds4 thumbnail. The thumbnails 821 displayed around the circular button of the thumbnail search interface 820 may correspond to a plurality of thumbnails with respect to a plurality of frames corresponding to a time interval between one thumbnail of a plurality of thumbnails displayed on a thumbnail search interface 810 corresponding to the position of the thumbnail control interface 820 and the next thumbnail.

Next, the video display device 800 may display a frame image corresponding to the corresponding thumbnail on an image display interface 830 based on the detected user input 840. Referring to FIG. 8A, the video display device 800 may display a frame image of the ds4 thumbnail on the image display interface 830 in response to user input to the ds4 thumbnail. Thereby, the user can perform detailed search with respect to each of the plurality of thumbnails displayed on the thumbnail search interface 810.

Figure 8B:
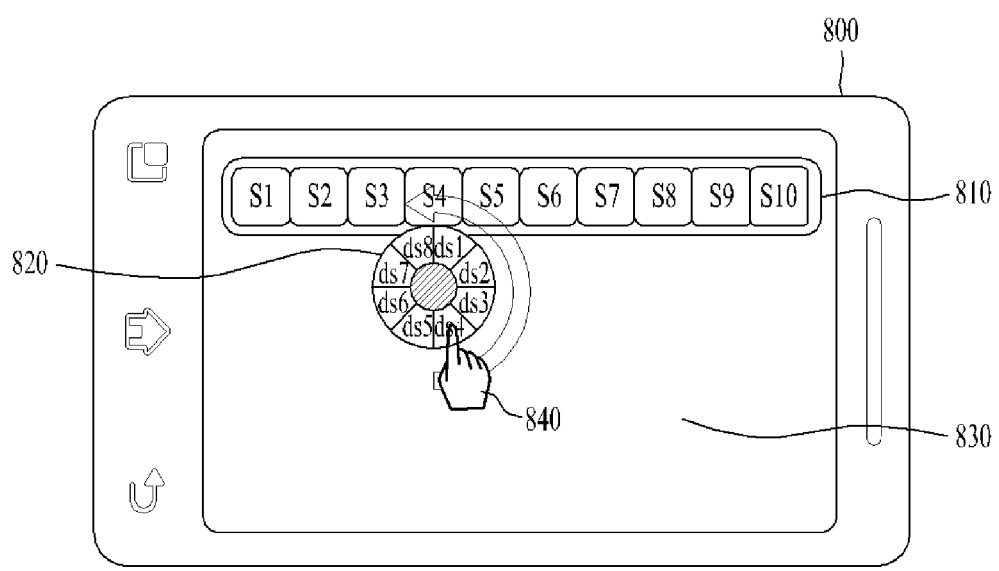

Alternatively, referring to FIG. 8B, the video display device 800 may detect the user input 840 to the thumbnail control interface 820. Here, the user input 840 may correspond to user to rotate the thumbnail control interface 820 counterclockwise from a position 840-1 to a position 840-2. Next, the video display device 800 may control at least one of the thumbnail search interface 810 and the thumbnail control interface 820 based on the detected user input 840.

Figure 8C:
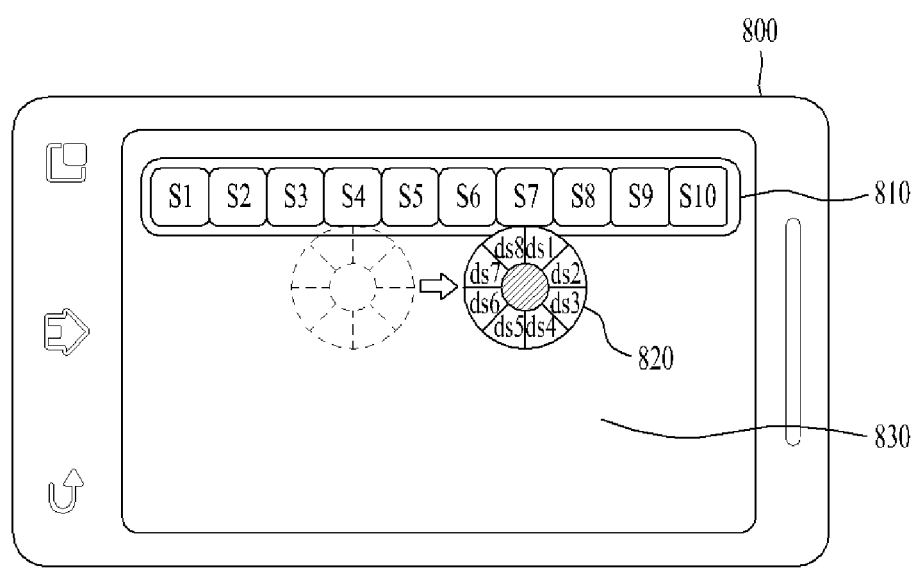

In one embodiment, referring to FIG. 8C, the video display device 800 may control the position of the thumbnail control interface 820 based on the detected user input. For example, when the thumbnail control interface 820 is rotated counterclockwise, the video display device 800 may move the position of the thumbnail control interface 820 rightward. Also, for example, when the thumbnail control interface 820 is rotated clockwise, the video display device 800 may move the position of the thumbnail control interface 820 leftward. In this case, the video display device 800 may display a frame image on the image display interface 830 based on the moved position of the thumbnail control interface 820. In this case, the plurality of thumbnails displayed on the thumbnail search interface 810 may correspond to the entire video that is being played back on the video display device 800, or thumbnails representing a part of the video. Thereby, the user can rapidly search an anterior or posterior image of the displayed frame image.

Figure 8D:
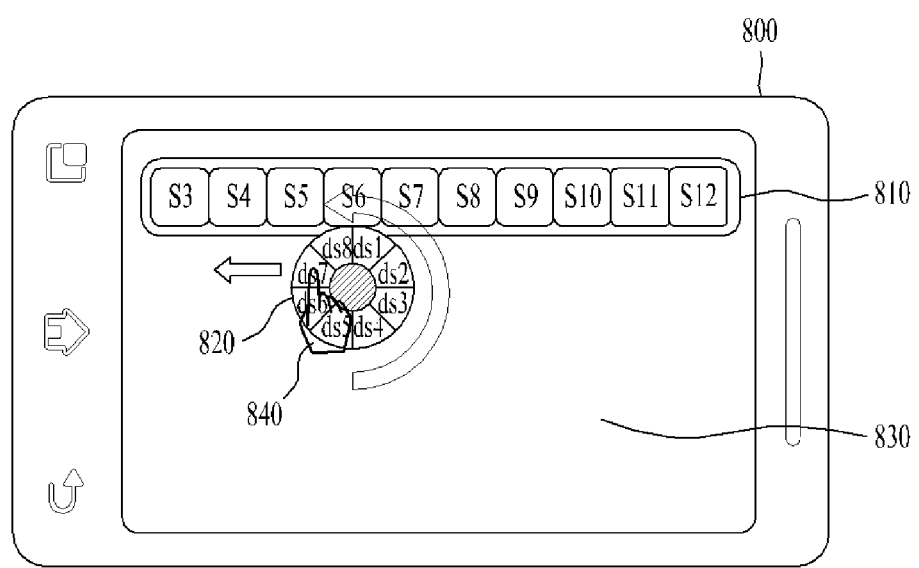

In another embodiment, referring to FIG. 8D, the video display device 800 may control movement of the plurality of thumbnails displayed on the thumbnail search interface 810 based on the detected user input. For example, when the thumbnail control interface 820 is rotated counterclockwise, the video display device 800 may move the plurality of thumbnails displayed on the thumbnail search interface 810 leftward. Also, when the thumbnail control interface 820 is rotated clockwise, the video display device 800 may move the plurality of thumbnails displayed on the thumbnail search interface 810 rightward. In this case, the plurality of thumbnails displayed on the thumbnail search interface 810 may correspond to thumbnails representing a part of a video that is being played back on the video display device 800. Also, the video display device 800 may display a frame image on the image display interface 830 based on the moved positions of the plurality of thumbnails displayed on the thumbnail search interface 810. Referring to FIG. 8D, the plurality of thumbnails may be moved leftward such that a thumbnail corresponding to the position of the thumbnail control interface 820 is changed from an S4 thumbnail to an S6 thumbnail via rotation of the thumbnail control interface 820. In this case, the video display device 800 may display a frame image corresponding to the S6 thumbnail on the image display interface. Thereby, the user can rapidly search an anterior or posterior image of the displayed image.

Figure 9A:
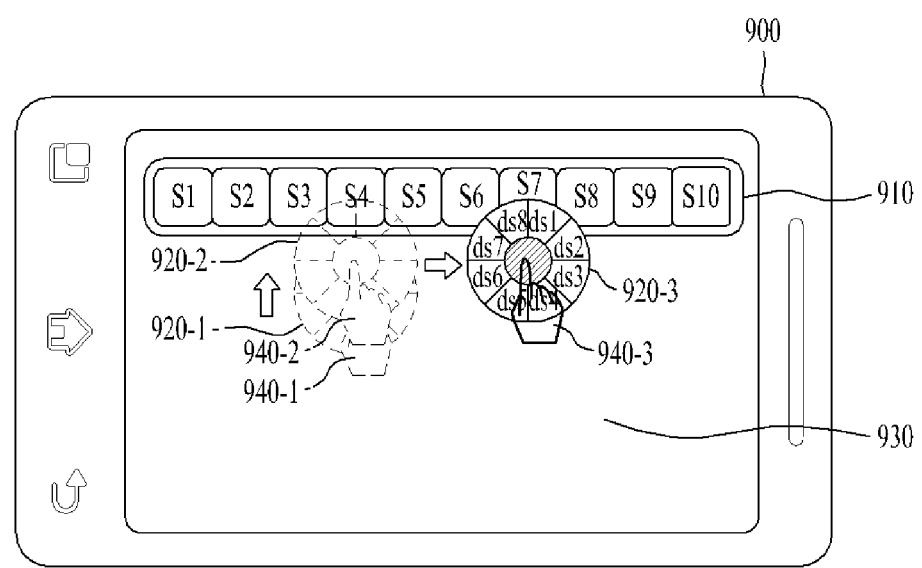
FIGS. 9A and 9B are diagrams illustrating an embodiment of a video search interface.
Figure 9B:
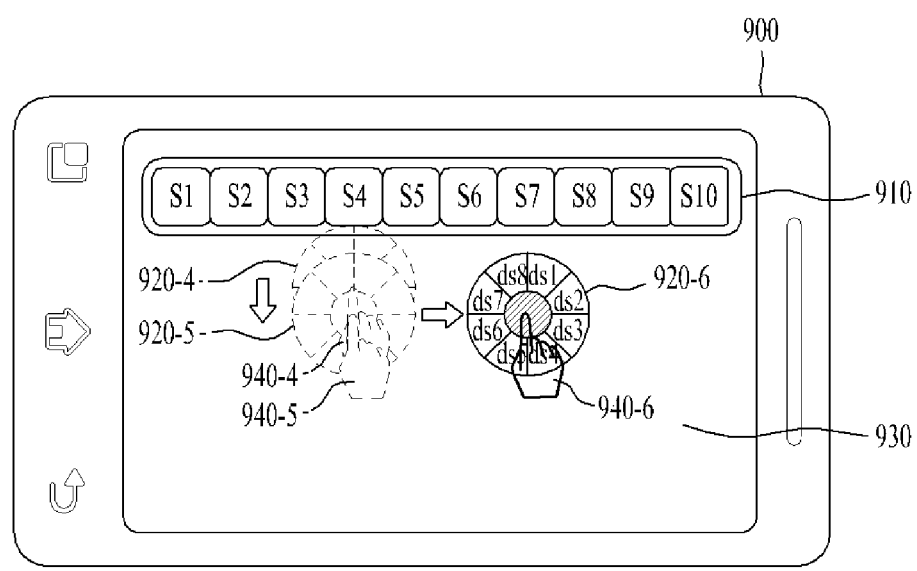

FIGS. 9A and 9B are views illustrating an embodiment of a video search interface. More specifically, FIGS. 9A and 9B illustrate movement of a thumbnail control interface in a video search interface in response to detected user input. For example, FIG. 9A illustrates low-speed video search and FIG. 9B illustrates high-speed video search.

With relation to low-speed video search, referring to FIG. 9A, a video display device 900 may detect first user input 940-1. Here, the first user input 940-1 may correspond to input to a circular button of a thumbnail control interface 920 when the thumbnail control interface 920 is located at a position 920-1. Next, the video display device 900 may detect second user input 940-2 subsequent to the first user input 940-1. The second user input 940-2 may correspond to input to move the thumbnail control interface upward to a position 920-2. In this case, the video display device 900 may reduce a distance between an uppermost point of the thumbnail search interface 910 and an uppermost point of the thumbnail control interface 920 that is located at the position 920-2. Accordingly, the video display device 900 may reduce at least one of a search speed of a plurality of thumbnails displayed on the thumbnail search interface 910 and a search speed of a frame image displayed on an image display interface 930. For example, the video display device 900 may control a search speed of an S4 thumbnail displayed on the thumbnail search interface 910 to be reduced to ½×. Also, the video display device 900 may control a search speed of a frame image corresponding to the S4 thumbnail displayed on the image display interface 930 to be reduced to ½×.

Next, the video display device 900 may detect third user input 940-3 subsequent to the second user input 940-2. Here, the third user input 940-3 may correspond to input to move the position of the thumbnail control interface 920 leftward, i.e. from the position 920-2 to a position 920-3. In this case, the video display device 900 may move the thumbnail control interface 920 rightward in response to the detected user input 940-3. Accordingly, the video display device 900 may control search of a thumbnail of a plurality of thumbnails displayed on the thumbnail search interface 910 corresponding to the position 920-3 of the thumbnail control interface 920, and search of a frame image displayed on the image display interface 930. For example, the video display device 900 may search an S7 thumbnail other than the S4 thumbnail of the thumbnails displayed on the thumbnail search interface 910 in response to the third user input 940-3. As such, the video display device 900 may display a frame image corresponding to the S7 thumbnail other than a frame image corresponding to the S4 thumbnail on the image display interface 930.

With relation to high-speed video search, referring to FIG. 9B, the video display device 900 may detect fourth user input 940-4. The fourth user input 940-4 may correspond to input to a circular button of the thumbnail control interface 920 that is located at the position 920-4. Next, the video display device 900 may detect fifth user input 940-5 subsequent to the fourth user input 940-4. Here, the fifth user input 940-5 may correspond to input to move the thumbnail control interface 920 downward. In this case, the video display device 900 may increase the distance between the uppermost point of the thumbnail search interface 910 and the uppermost point of the thumbnail control interface 920 that is located at a position 920-5. Accordingly, the video display device 900 may increase at least one of a search speed of the plurality of thumbnails displayed on the thumbnail search interface 910 and a search speed of the frame image displayed on the image display interface 930. For example, the video display device 900 may control a search speed of the S4 thumbnail displayed on the thumbnail search interface 910 to be increased to 2×. Also, the video display device 900 may control a search speed of a frame image corresponding to the S4 thumbnail displayed on the image display interface 930 to be increased to 2×.

Next, the video display device 900 may detect sixth user input 940-6 subsequent to the fifth user input 940-5. Here, the sixth user input 940-6 may correspond to input to move the position of the thumbnail control interface 920 rightward, i.e. from the position 920-5 to a position 920-6. In this case, the video display device 900 may move the thumbnail control interface 920 rightward in response to the detected user input 940-6. Accordingly, the video display device 900 may control search of the thumbnail of the plurality of thumbnails displayed on the thumbnail search interface 910 corresponding to the position 920-6 of the thumbnail control interface 920, and search of a frame image displayed on the image display interface 930. For example, the video display device 900 may search the S7 thumbnail other than the S4 thumbnail among the thumbnails displayed on the thumbnail search interface 910 in response to the sixth user input 940-6. As such, the video display device 900 may display a frame image corresponding to the S7 thumbnail other than a frame image corresponding to the S4 thumbnail on the image display interface 930.

In this way, in addition to performing high-speed video search or low-speed video search via upward or downward movement of the thumbnail control interface, the user can easily perform direct search of a thumbnail or frame image that the user wishes to display via leftward or rightward movement of a thumbnail control interface.

Figure 10A:
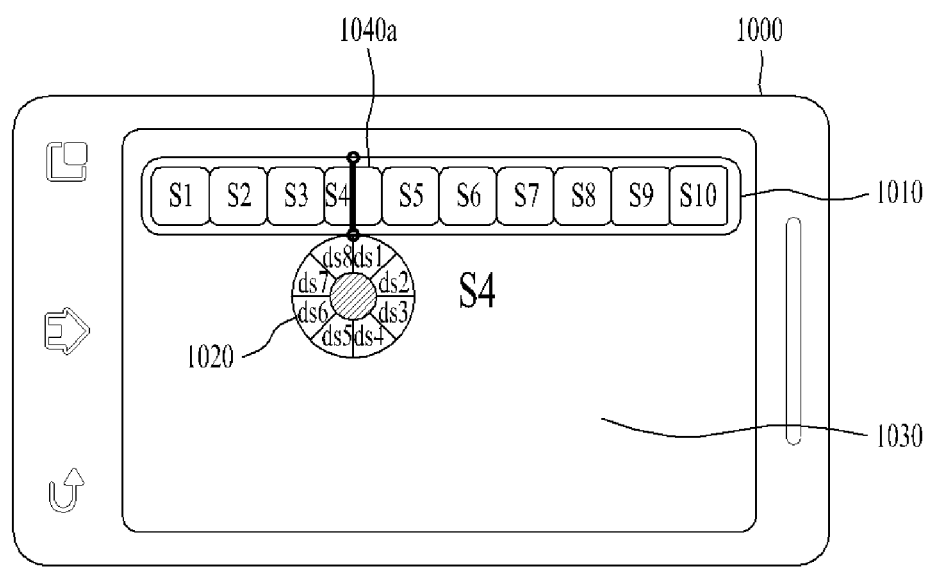
FIGS. 10A and 10B are diagrams illustrating an indicator of a video search interface.
Figure 10B:
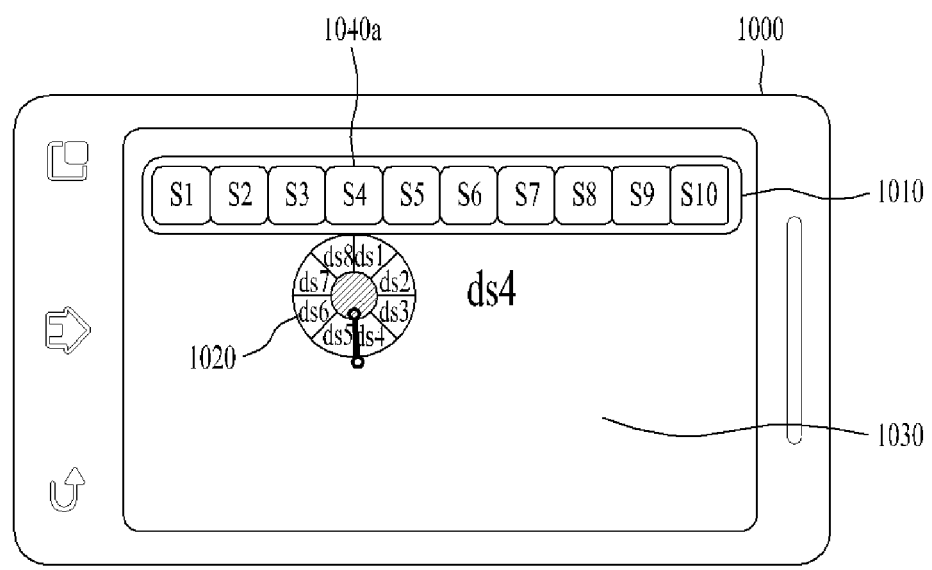

FIGS. 10A and 10B are views illustrating an indicator of a video search interface. Referring to FIGS. 10A and 10B, a video display device 1000 may display a search position on a thumbnail search interface 1010 or on a thumbnail control interface 1020 using an indicator 1040.

Referring to FIG. 10A, the video display device 1000 may display a first indicator 1040*a* on the thumbnail search interface 1010. Here, the indicator 1040*a* may represent the position of the thumbnail of a plurality of thumbnails displayed on the thumbnail search interface 1010 corresponding to a frame image displayed on an image display device 1030. The video display device 1000 may display the indicator 1040*a* in such a way that a lower end of the indicator 1040*a* displayed on the thumbnail search interface 1010 comes into contact with a thumbnail control interface 1020. Thereby, as video search is advanced, the positions of the first indicator 1040*a* and the thumbnail control interface 1020 may be moved simultaneously. For example, the first indicator 1040*a* may have a bar shape, a dumbbell shape, or the like.

The video display device 1000 may display, on the image display interface 1030, a frame image corresponding to a thumbnail where the first indicator 1040*a* is located among the thumbnails displayed on the thumbnail search interface 1010. For example, referring to FIG. 10A, the first indicator 1040*a* is displayed at the middle of the abscissa of an S4 thumbnail. Thus, when there are 100 frame images corresponding to the S4 thumbnail, the video display device 1000 may display a $50^{th}$ frame image of the 100 frame images on the image display interface 1030. Additionally, as the video search is advanced, the position of the first indicator 1040*a* may be moved leftward or rightward. With movement of the position of the first indicator 1040*a*, an image displayed on the image display interface 1030 may be changed. Here, the image displayed on the image display interface 1030 may be changed slowly or quickly based on a movement speed of the first indicator 1040*a*.

Referring to FIG. 10B, the video display device 1000 may display a second indicator 1040*b* on the thumbnail control interface 1020. The second indicator 1040*b* may represent the position of a thumbnail of a plurality of thumbnails displayed on the thumbnail control interface 1020 corresponding to a frame image displayed on the image display interface 1030. The video display device 1000 may display, on the image display interface 1030, a frame image corresponding to a thumbnail where the second indicator 1040*b* is located among a plurality of thumbnails 1021 displayed on the thumbnail control interface 1020. For example,
referring to FIG. 10B, the second indicator 1040*b* is displayed at a distal portion of the ds4 thumbnail. As such, when there are 10 frame images corresponding to the ds4 thumbnail, the video display device 1000 may display a $9^{th}$ frame image among the 10 frame images on the image display interface 1030.

In one embodiment, the second indicator 1040*b* may be fixed and displayed at an upper end or a lower end of the thumbnail control interface 1020. Thus, during video search, the plurality of thumbnails 1021 displayed on the thumbnail control interface 1020 may be moved clockwise or counterclockwise, and the second indicator 1040*b* may be fixed. Referring to FIG. 10B, the second indicator 1040*b* may be displayed at a lowermost point of the thumbnail control interface 1020. In another embodiment, the second indicator 1040*b* may be moved on the plurality of thumbnails 1021 displayed on the thumbnail control interface 1020. As such, during video search, the second indicator 1040*b* displayed on the thumbnail control interface 1020 may be moved clockwise or counterclockwise, and the plurality of thumbnails 1021 may be fixed. In this case, even an image displayed on the image display interface 1030 may be changed slowly or quickly based on a movement speed of the second indicator 1040*b*.

Through the indicator 1040 of FIGS. 10A and 10B, the user can easily recognize the position of a frame image on a video search interface or a video control interface that the user wishes to search.

Figure 11:
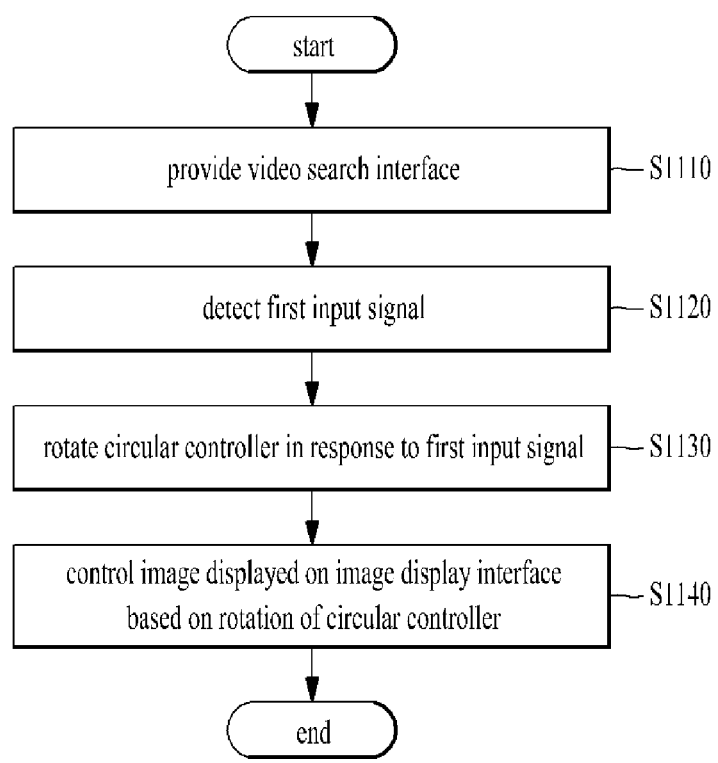
FIG. 11 is a flowchart illustrating a control method of a video display device.

FIG. 11 is a flowchart illustrating a control method of a video display device. Respective operations of FIG. 11 that will be described hereinafter may be controlled by the processor 130 of the video display device 100 illustrated in FIG. 1.

First, the video display device 100 may provide a video search interface (S1110). The video search interface may include an image display interface, a thumbnail search interface to display a plurality of thumbnails with respect to a video that is being displayed on the image display interface, and a thumbnail control interface to control at least one of the image display interface and the thumbnail search interface.

Next, the video display device 100 may detect a first input signal (S1120). Here, as described above in FIGS. 8A to 8D, the first input signal may include touch input and hovering input signals. Also, the first input signal may include long-touch, multi-touch, and touch-and-drag signals.

Next, the video display device 100 may rotate a circular controller in response to the first input signal (S1130). Rotation of the circular controller may include clockwise rotation or counterclockwise rotation.

Next, the video display device 100 may control an image that will be displayed on the image display interface based on rotation of the circular controller (S1140). As described above in FIGS. 8A to 8D, the video display device 100 may move at least one of a plurality of thumbnails displayed on the thumbnail search interface and the thumbnail search interface based on rotation of the circular controller.

Figure 12:
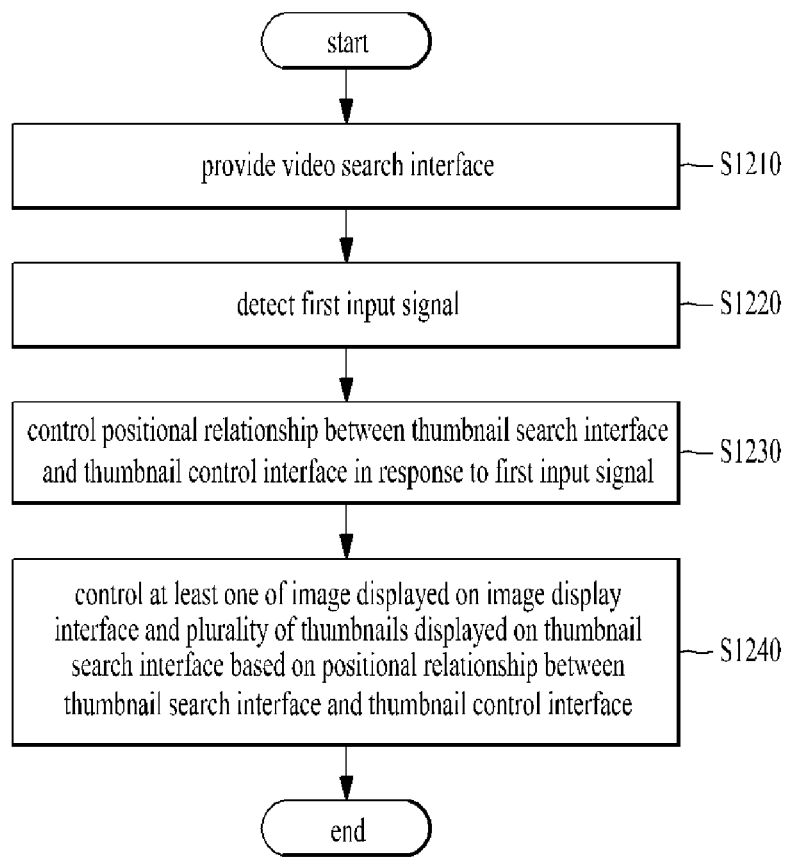
FIG. 12 is a flowchart illustrating a control method of a video display device.

FIG. 12 is a flowchart illustrating a control method of a video display device. Respective operations of FIG. 12 that will be described hereinafter may be controlled by the processor 130 of the video display device 100 illustrated in FIG. 1. In the embodiment of FIG. 12, a detailed description of the same or similar parts to the above described embodiment of FIG. 11 will be omitted.

First, the video display device 100 may provide a video search interface (S1210). Here, the video search interface may include an image display interface, a thumbnail search interface to display a plurality of thumbnails with respect to a video that is being displayed on the image display interface, and a thumbnail control interface to control at least one of the image display interface and the thumbnail search interface.

Next, the video display device 100 may detect a first input signal (S1220). Here, as described above in FIGS. 6A and 7D, the first input signals may include touch input and hovering input signals.

Next, the video display device 100 may control a positional relationship between the thumbnail search interface and the thumbnail control interface in response to the first input signal (S1230). For example, as described above in FIGS. 4A and 4B, the positional relationship between the thumbnail search interface and the thumbnail control interface may include a distance between the thumbnail search interface and the thumbnail control interface and corresponding positions therebetween.

Next, the video display device 100 may control at least one of images displayed on the image display interface and a plurality of thumbnails displayed on the thumbnail search interface based on the positional relationship between the thumbnail search interface and the thumbnail control interface (S1240). Here, the distance between the thumbnail search interface and the thumbnail control interface may include a distance between an uppermost point of the thumbnail search interface and an uppermost point of the thumbnail control interface. The corresponding positions between the thumbnail search interface and the thumbnail control interface may include the position of at least one thumbnail of the plurality of thumbnails displayed on the thumbnail search interface corresponding to the position of the thumbnail control interface.

As described above in FIGS. 4A and 4B, the video display device 100 may control a time interval between the thumbnails displayed on the thumbnail search interface based on the distance between the thumbnail search interface and the thumbnail control interface. Also, the video display device 100 may control the number of frames corresponding to each of the plurality of thumbnails displayed on the thumbnail search interface based on the distance between the thumbnail search interface and the thumbnail control interface. The video display device may control the size of at least one of the plurality of thumbnails displayed on the thumbnail search interface based on the distance between the thumbnail search interface and the thumbnail control interface. The video display device may control a search speed of a frame image displayed on the image display interface based on the distance between the thumbnail search interface and the thumbnail control interface. Meanwhile, the video display device may display, on the image display interface, a frame image of a thumbnail of a plurality of thumbnails displayed on the thumbnail search interface corresponding to the position of the thumbnail control interface based on the distance between the thumbnail search interface and the thumbnail control interface.

Although the respective drawings have been described separately for convenience, the embodiments described in the respective drawings may be combined to realize new embodiments. Also, designing a computer readable recording medium in which programs to execute the above described embodiments are recorded according to demands of those skilled in the art is within the scope of the present disclosure.

The video display device and the control method thereof described herein are not limited to the configurations and methods of the above described embodiments, and all or some of the embodiments may be selectively combined to achieve various modifications.

Meanwhile, the video display device and the control method thereof described herein may be implemented as code that can be written on a processor readable recording medium and thus read by a processor provided in a network device. The processor readable recording medium may be any type of recording device in which data is stored in a processor readable manner. Examples of the processor readable recording medium include a ROM, a RAM, a magnetic tape, a floppy disc, an optical data storage device, and a carrier wave (e.g., data transmission over the Internet). Also, the processor readable recording medium can be distributed over a plurality of computer systems connected to a network so that processor readable code is written thereto and executed therefrom in a decentralized manner.

As is apparent from the above description, according to the disclosure, multispeed video search is possible via intuitive and simple user input.

According to the disclosure, the user can perform more intuitive multispeed video search using a circular controller.

According to the disclosure, the user can intuitively recognize change of playback properties as the thickness and interval of a thumbnail search interface is varied in response to user input. Also, the user can slowly or quickly perform video search via variation in the thickness and interval of the thumbnail search interface.

According to the disclosure, rotation and movement of a thumbnail control interface are possible in response to user input, which ensures simplified and easy video search via the thumbnail control interface.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

This specification describes both an object invention and a method invention, and description of both inventions may be selectively applied as necessary.

What is claimed is:

1. A video display device comprising:
   a display unit configured to display a video;
   a sensor unit configured to detect user input and transmit an input signal based on the detected user input to a processor; and
   the processor configured to provide a video search interface,
   wherein the video search interface includes an image display interface, a thumbnail search interface displaying a plurality of thumbnails with respect to the video that is being displayed on the image display interface, and a thumbnail control interface controlling at least one of the image display interface and the thumbnail search interface,
   wherein the thumbnail control interface includes a circular controller, and wherein the thumbnail control interface controls display of an image on the image display interface based on rotation of the circular controller,
   wherein the thumbnail search interface and the thumbnail control interface are simultaneously displayed,
   wherein a search speed of the image displayed on the image display interface is determined based on a distance between the thumbnail search interface and the thumbnail control interface, wherein the search speed of the image display interface corresponds to a 1× search mode when a border of the thumbnail search interface contacts with a border of the thumbnail control interface, and wherein a size of the plurality of thumbnails displayed on the thumbnail search interface is determined based on the distance between the thumbnail search interface and the thumbnail control interface.

2. The video display device according to claim 1, wherein a positional relationship between the thumbnail search interface and the thumbnail control interface includes a corresponding position between the thumbnail search interface and the thumbnail control interface.

3. The video display device according to claim 1, wherein the distance between the thumbnail search interface and the thumbnail control interface includes a distance between an uppermost point of the thumbnail search interface and an uppermost point of the thumbnail control interface on the basis of a height of the thumbnail search interface and the thumbnail control interface.

4. The video display device according to claim 1, wherein the processor is configured to control a time interval between the thumbnails displayed on the thumbnail search interface based on the distance between the thumbnail search interface and the thumbnail control interface.

5. The video display device according to claim 1, wherein the processor is configured to control a number of frames corresponding to each of the plurality of thumbnails displayed on the thumbnail search interface based on the distance between the thumbnail search interface and the thumbnail control interface.

6. The video display device according to claim 2, wherein the corresponding position between the thumbnail search interface and the thumbnail control interface includes the position of at least one thumbnail of the plurality of thumbnails displayed on the thumbnail search interface corresponding to the position of the thumbnail control interface.

7. The video display device according to claim 6, wherein the processor is configured to control display of the thumbnail of the plurality of thumbnails displayed on the thumbnail search interface corresponding to the position of the thumbnail control interface, based on the corresponding positions between the thumbnail search interface and the thumbnail control interface.

8. The video display device according to claim 6, wherein the processor is configured to display, on the image display interface, an image of the thumbnail of the plurality of thumbnails displayed on the thumbnail search interface corresponding to the position of the thumbnail control interface based on the corresponding positions between the thumbnail search interface and the thumbnail control interface.

9. The video display device according to claim 8, wherein the image of the thumbnail includes at least one frame image of a plurality of frame images corresponding to the thumbnail.

10. The video display device according to claim 1, wherein the processor is configured to rotate the circular controller in response to the first input signal, and display, on the image display interface, an image of the thumbnail of the plurality of thumbnails displayed on the thumbnail search interface corresponding to the position of the rotated circular controller in response to rotation of the circular controller.

11. The video display device according to claim 1, wherein the processor is configured to rotate the circular controller in response to the first input signal, and move at least one of the plurality of thumbnails displayed on the thumbnail search interface and the thumbnail control interface in response to rotation of the circular controller.

12. The video display device according to claim 1, wherein the processor is further configured to control an image displayed on the image display interface based on the position of the circular controller.

13. The video display device according to claim 1, wherein the processor is configured to control a positional relationship between the thumbnail search interface and the thumbnail control interface in response to a second input signal.

14. The video display device according to claim 1, wherein the thumbnail control interface displays a plurality of thumbnails with respect to a plurality of frames corresponding to a time interval between a thumbnail of the plurality of thumbnails displayed on the thumbnail search interface corresponding to a position of the thumbnail control interface and a next thumbnail.

15. The video display device according to claim 14, wherein the processor is configured to display, on the image display interface, an image of one thumbnail of the plurality of thumbnails displayed on the thumbnail control interface in response to a third input signal.

16. The video display device according to claim 15, wherein the image displayed on the image display interface includes an image of the thumbnail of the plurality of thumbnails displayed on the thumbnail control interface corresponding to the position of the thumbnail search interface.

17. The video display device according to claim 1, wherein the thumbnail search interface further includes a first indicator representing a position of a frame image displayed on the image display interface at the plurality of thumbnails.

18. The video display device according to claim 17, wherein the processor is configured to display, on the image display interface, a frame image of the thumbnail of the plurality of thumbnails displayed on the thumbnail search interface corresponding to the position of the first indicator.

19. The video display device according to claim 1, wherein the thumbnail control interface further includes a second indicator representing a position of a frame image displayed on the image display interface at the plurality of thumbnails.

20. The video display device according to claim 19, wherein the processor is configured to display, on the image display interface, a frame image of the thumbnail of the plurality of thumbnails displayed on the thumbnail control interface corresponding to the position of the second indicator.

21. The video display device according to claim 1, wherein the thumbnail search interface displays the plurality of thumbnails of the video in a time sequence.

22. The video display device according to claim 1, wherein the thumbnail search interface displays the plurality of thumbnails representing an entire video.

23. A control method using a video display device, the method comprising:

providing a video search interface, wherein the video search interface includes an image display interface, a thumbnail search interface displaying a plurality of thumbnails with respect to the video that is being displayed on the image display interface, and a thumbnail control interface controlling at least one of the image display interface and the thumbnail search interface, and wherein the thumbnail control interface includes a circular controller;

detecting a first input signal;

rotating the circular controller in response to the first input signal; and controlling an image displayed on the image display interface based on the rotation of the circular controller, wherein the thumbnail search interface and the thumbnail control interface are simultaneously displayed, wherein a search speed of the image displayed on the image display interface is determined based on a distance between the thumbnail search interface and the thumbnail control interface, wherein the search speed of the image display interface corresponds to a 1× search mode when a border of the thumbnail search interface contacts with a border of the thumbnail control interface, and wherein a size of the plurality of thumbnails displayed on the thumbnail search interface is determined based on the distance between the thumbnail search interface and the thumbnail control interface.

24. The control method according to claim 23, wherein the controlling the image displayed on the image display interface includes moving at least one of the plurality of thumbnails displayed on the thumbnail search interface and the thumbnail control interface in response to rotation of the circular controller.

25. A control method using a video display device, the method comprising:

providing a video search interface, wherein the video search interface includes an image display interface, a thumbnail search interface displaying a plurality of thumbnails with respect to the video that is being displayed on the image display interface, and a thumbnail control interface controlling at least one of the image display interface and the thumbnail search interface;

detecting a first input signal;

controlling a positional relationship between the thumbnail search interface and the thumbnail control interface in response to the first input signal; and controlling at least one of an image displayed on the image display interface and the plurality of thumbnails displayed on the thumbnail search interface based on the positional relationship between the thumbnail search interface and the thumbnail control interface, wherein the thumbnail search interface and the thumbnail control interface are simultaneously displayed, wherein a search speed of the image displayed on the image display interface is determined based on a distance between the thumbnail search interface and the thumbnail control interface, wherein the search speed of the image display interface corresponds to a 1× search mode when a border of the thumbnail search interface contacts with a border of the thumbnail control interface, and wherein a size of the plurality of thumbnails displayed on the thumbnail search interface is determined based on the distance between the thumbnail search interface and the thumbnail control interface.

26. The control method according to claim 25, wherein the positional relationship between the thumbnail search interface and the thumbnail control interface includes a corresponding position between the thumbnail search interface and the thumbnail control interface.

* * * * *